(12) United States Patent
Pez et al.

(10) Patent No.: US 7,101,530 B2
(45) Date of Patent: *Sep. 5, 2006

(54) HYDROGEN STORAGE BY REVERSIBLE HYDROGENATION OF PI-CONJUGATED SUBSTRATES

(75) Inventors: Guido P. Pez, Allentown, PA (US); Aaron R. Scott, Allentown, PA (US); Alan C. Cooper, Macungie, PA (US); Hansong Cheng, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 352 days.
This patent is subject to a terminal disclaimer.

(21) Appl. No.: 10/430,246

(22) Filed: May 6, 2003

(65) Prior Publication Data
US 2004/0223907 A1 Nov. 11, 2004

(51) Int. Cl.
*C01B 3/00* (2006.01)
*F17C 11/00* (2006.01)

(52) U.S. Cl. .................... 423/644; 423/648.1; 206/0.7; 48/61

(58) Field of Classification Search ................ 423/644, 423/648.1; 206/0.7; 48/61
See application file for complete search history.

(56) References Cited

U.S. PATENT DOCUMENTS

| | | | |
|---|---|---|---|
| 4,567,033 A | 1/1986 | Kesten ................... | 423/648 R |
| 5,197,523 A | 3/1993 | Fink, Jr. et al. | |
| 5,435,356 A | 7/1995 | Rabinovich | |
| 6,074,447 A | 6/2000 | Jensen ........................... | 48/61 |
| 6,544,400 B1 | 4/2003 | Hockaday et al. | |
| 6,607,707 B1 * | 8/2003 | Reichman et al. ....... | 423/648.1 |
| 6,680,042 B1 * | 1/2004 | Schulz et al. ............... | 423/644 |
| 2001/0016283 A1 | 8/2001 | Shiraishi, et al. ......... | 429/218.2 |
| 2002/0096048 A1 | 7/2002 | Cooper et al. ................ | 95/116 |
| 2005/0002857 A1 * | 1/2005 | Pez et al. ................ | 423/648.1 |

FOREIGN PATENT DOCUMENTS

| | | |
|---|---|---|
| JP | 2001110437 A | 4/2001 |
| JP | 2001198469 A | 7/2001 |
| JP | 2002134141 A | 5/2002 |
| JP | 2002184436 A | 6/2002 |
| JP | 2002187702 A | 7/2002 |
| JP | 2002274803 A | 9/2002 |
| JP | 2002274804 A | 9/2002 |
| JP | 2003321201 A | 11/2003 |
| JP | 2004026582 A | 1/2004 |
| RU | 2 160 698 C1 | 12/2000 |
| WO | WO02/38494 A2 | 5/2002 |
| WO | WO 2005/053832 | 6/2005 |

OTHER PUBLICATIONS

Dillon, et al., "Storage of Hydrogen in Single-Walled Carbon Nanotubes", *Letters to Nature*, Mar. 27, 1997, vol. 386, pp. 377-379.
Chambers, et al., "Hydrogen Storage in Graphite Nanofibers", *The Journal of Physical Chemistry B*, May 28, 1998, vol. 102, No. 22, pp. 4253-4256.
Cho, et al., "Hydrogen Sorption in HCl-Treated Polyaniline and Polypyrrole"; New Potential Hydrogen Storage Media, *Fuel Chemistry Division Preprints*, 2002, 47(2), pp. 790-791.
Kariya, et al., Efficient Evolution of Hydrogen from Liquid Cycloalkanes Over Pt-containing Catalysts Supported on Active Carbons Under "Wet-Dry Multiphase Conditions", *Applied Catalysts A : General*, 233 (2002), pp. 91-102.
Loutfy et al., "Investigation of Hydrogen Storage in Liquid Organic Hydrides", Proceedings of the *International Hydrogen Energy Forum 2000*, Munich Germany, 2000; pp. 335-340.
Dillon, et al., "Hydrogen Storage Using Carbon Adsorbents: Past, Present and Future", *Applied Physics A*, 72 (2001), pp. 133-142.
Hodoshima, et al., "Liquid-film-type Catalytic Decalin Dehydrogeno-aromatization for Long-term Storage and Long-distance Transportation of Hydrogen", *International Journal of Hydrogen Energy*, 28(2003), pp. 197-204.
"Conducting Plastics Pack the Hydrogen", *Science*, vol. 297, Sep. 13, 2002, p. 1796.
U.S. Appl. No. 10/833,484, filed Apr. 27, 2004, Pez et al.
U.S. Appl. No. 10/833,467, filed Apr. 27, 2004, Bagzis et al.
U.S. Appl. No. 11/266,803, filed Nov. 04, 2005, Pez et al.
"Liquid Organic Hydrides: A Better Way to Store and Transport Hydrogen?", *Chem. Eng.*, 21 (Mar. 2003).
G. Pez, "Toward New Solid and Liquid Phase Systems for the Containment, Transport and Deliver of Hydrogen," May 2003 (see http://www.eere.energy.gov/hydrogenandfuelcells/pdfs/solid_carriers_pres_air_prod.pdf).
Hodoshima, et al., "Catalytic Decalin Dehydrogenation/Naphthalene Hydrogenation Pari as a Hydrogen Source for Fuel-Cell Vehicle", *International Journal of Hydrogen Energy*, 28, 1255-1262 (2003).
Newson, et al., "Seasonal Storage of Hydrogen in Stationary Systems with Liquid Organic Hydrides", *Int. J. Hydrogen Energy*, vol. 23, No. 10, pp. 905-909 (1998).
A. Cooper et al, "Hydrogen Storage and Delivery β Reversible Hydrogenation of Liquid-Phase Hydrogen Carriers," Prepr. Pap Am. Chem. Soc., Div. Fuel Chem. 2005, 50 (1), 271.
Lamartine, R et al.; "Organic Solid Hydrogenaton — Hydrogen Spill-Over;" Elsevier Science Publishers V.B. Amsterdam (1983); pp. 251-259.

* cited by examiner

*Primary Examiner*—Stanley S. Silverman
*Assistant Examiner*—Timothy C. Vanoy
(74) *Attorney, Agent, or Firm*—Michael K. Boyer

(57) ABSTRACT

Processes are provided for the storage and release of hydrogen by means of a substantially reversible catalytic hydrogenation of extended pi-conjugated substrates which include large polycyclic aromatic hydrocarbons, polycyclic aromatic hydrocarbons with nitrogen heteroatoms, polycyclic aromatic hydrocarbons with oxygen heteroatoms, polycyclic aromatic hydrocarbons with alkyl, alkoxy, ketone, ether or polyether substituents, pi-conjugated molecules comprising 5 membered rings, pi-conjugated molecules comprising six and five membered rings with nitrogen or oxygen hetero atoms, and extended pi-conjugated organic polymers. The hydrogen, contained in the at least partially hydrogenated form of the extended pi-conjugated system, can be facilely released for use by a catalytic dehydrogenation of the latter in the presence of a dehydrogenation catalyst which can be effected by lowering the hydrogen gas pressure, generally to pressures greater than 0.1 bar or raising the temperature to less than 250° C. or less, or by a combination of these two process parameters.

56 Claims, 10 Drawing Sheets

HYDROGEN STORAGE BY REVERSIBLE HYDROGENATION OF PI-CONJUGATED SUBSTRATES

BACKGROUND OF THE INVENTION

This invention relates to processes for the reversible hydrogenation of pi-conjugated substrates to provide for the storage and release of hydrogen at practical operating temperatures and pressures, particularly for supplying hydrogen to fuel cells. Hydrogen is a widely used chemical commodity in the chemical and petroleum processing industries, but with the relatively recent development of fuel cells it is increasingly also being considered as a viable "clean" energy source. Stationary fuel cells can be supplied with hydrogen from on-site natural gas reformers or via existing hydrogen pipeline sources. However, for mobile vehicular systems, a practical and effective method for storing hydrogen to power an on-board fuel cell is required. The transport of hydrogen as a cryogenic liquid, although technologically well established, is an energy-intensive process which results in a significantly higher cost of the delivered gas. Hydrogen is also conventionally transported as a compressed gas in steel cylinders, but the storage capacity is relatively low. Higher gravimetric storage amounts, but at relatively low volumetric densities, can now be achieved with hydrogen gas at very high pressures up to 10,000 psi (690 bar) in light-weight containers made of very high strength composite materials. There are considerable energy costs in thus compressing the gas as well as potential issues regarding consumers' acceptance of systems that contain hydrogen at such elevated pressures.

It is thus necessary and highly desirable to devise a means of storing hydrogen safely, at an adequate gravimetric and volumetric storage density and with a minimal consumption of energy. This may be accomplished by "containing" the hydrogen in a suitable solid, or potentially even in liquid sorbent media, compositions which have a substantial but reversible affinity for the gas. The gas is contacted with the sorbent at modest temperatures and hydrogen pressures and is released for use as required, by lowering the system's hydrogen partial pressure at the same or a higher temperature. Hydrogen uptake by the sorbent is usually an exothermic process, while the release of hydrogen for use requires at least the corresponding input of thermal energy which can be met from the fuel cell's waste heat. Thus, in contrast to compressed hydrogen-based storage systems, the necessary energy needed for containing the hydrogen (i.e. its heat of adsorption) can thus largely be met without significant consumption of higher grade electrical energy for compression. Also, there is a considerably increased safety factor in a sorbed hydrogen. Since any desorption process is endothermic, it will be naturally self-retarding and the hydrogen will not spontaneously totally desorb without an external input of heat.

DESCRIPTION OF THE RELATED ART

The challenge in this sorbent approach to hydrogen storage is in devising the appropriate functioning sorbent media. Much of the research on containing hydrogen in this way has focused on the property of various metals and metal alloys to reversibly chemically combine with hydrogen to form metal hydrides. Representative examples are FeTi, TiV alloys, $LaNi_5$, various magnesium-nickel combinations and sodium alanate, $NaAlH_4$, which can reversibly dissociate in the presence of some catalysts into Al, NaH and $H_2$. There is a substantial literature on metal hydrides and while research is still being actively pursued in this field for instance on tri- and multi-metal hydrides, demonstrated gravimetric hydrogen capacities are still well short of the 6+ wt % hydrogen that are required for vehicular hydrogen storage.

There have recently been a number of claims of hydrogen storage by various forms of carbon: as single wall nanotubes by A. C. Dillon et al in Nature 386, 377–379 (1997); and as graphitic nanofibers by Chambers et al in J. Phys. Chem. B 102, 4253–4256 (1998). However, these and other literature claims of a substantial hydrogen containment by carbons [see A. C. Dillon and M. J. Heben in Appl. Phys. A 72,133–142 (2001)] have not been specifically confirmed by other investigators; the field of hydrogen sorption by carbons has remained an open area of research. In this context Cooper and Pez in US2002/0096048 have reported that intimate combinations of hydrogen reactive metals or metal alloys, or metal hydrides with various forms of substantially graphitic carbon, i.e. carbon-metal hybrids, display a reversible uptake of hydrogen at near ambient conditions and are useful as pressure-swing and temperature-swing sorbents for the storage of hydrogen. The observed reversible facile hydrogen reactivity is theorized to occur either by a "hydrogen-spillover" mechanism or by a partial reversible metal-catalyzed hydrogenation of the unsaturated graphitic carbon structures.

A recent report by S. J. Cho et al in ACS Fuel Chemistry Division Preprints 47(2), 790–791 (2002) claims the adsorption of hydrogen by the hydrochloric acid-doped conducting polymers polyaniline and polypyrrole. These polymers are exposed to high pressure (1350 psia, 93 bar) hydrogen at 25° C. resulting in an apparent slow uptake of hydrogen gas. The hydrogen gas is desorbed by heating the sample to 200° C. at an unspecified gas pressure. The authors speculate that the hydrogen is physically adsorbed (ie. the H—H bond remains intact) in the porous conducting polymers. Samples that were not treated with hydrochloric acid, which apparently induces porosity in the polymer samples, did not show any uptake of hydrogen. No metal catalysts are reported to be present in the material and no indication for chemical adsorption of hydrogen or catalytic hydrogenation of the polymer is given in this publication.

The possibility of storing hydrogen via the catalytic hydrogenation and then dehydrogenation of common aromatic molecules such as benzene or toluene has long been disclosed as a means of storing the hydrogen. With a theoretical hydrogen storage capacity of about 7 weight percent, the systems seem attractive. But while this chemistry is performed routinely in chemical plants there are numerous difficulties in utilizing it in a practical hydrogen storage device.

The principal obstacles are as follows:

With the appropriate metal catalysts, the hydrogenation of benzene, toluene, naphthalene and related one or two six-membered ring aromatics to the corresponding saturated cyclic hydrocarbons, cyclohexane, methylcyclohexane and decalin, respectively can be conducted at relatively mild conditions, e.g. ~100° C. and ~100 psi (6.9 bar) of hydrogen pressure, where it is thermodynamically very favorable. However, dehydrogenation of the above cited corresponding alkanes to produce hydrogen gas at the about 20 psia (1.5 bar) and higher delivery pressures that are required for use in fuel cells is, as currently performed, a highly endothermic process and thus requires the use of higher reaction temperatures than are easily obtainable from fuel cells, especially those presently used in vehicles, as well as a significant input of energy. Thus, in U.S. Pat. No. 4,567,033 A. S. Kesten describes a method of "freeing" molecular hydrogen from methylcyclohexane by its dehydrogenation to toluene at 316° C., the required thermal input being supplied by a combustion of a considerable portion of the by-product hydrogen.

Additionally, the common one or two six-membered ring aromatic molecules are quite volatile as are their hydrogenated products. While the hydrogenation can be conducted in a closed system, the production of product hydrogen from the reverse reaction fundamentally requires that there be some means of totally separating the gas from the reaction's organic volatile components. While technically possible, this requires a further unit operation which increases the complexity and hence the cost of the hydrogen storage process.

There have been several attempts to provide practical processes for storing hydrogen via a reversible hydrogenation of aromatics. C. M. Jensen in U.S. Pat. No. 6,074,447 provides a means of dehydrogenating a hydrocarbon to an aromatic and hydrogen in the presence of a particular iridium-based molecular complex catalyst at preferably 190° C. or higher. Specifically described hydrocarbons are methylcyclohexane, decalin, dicyclohexyl, and cyclohexane (for which the corresponding aromatic products are toluene, naphthalene, biphenyl and benzene); there is no mention of any larger hydrogenated hydrocarbons or the polycyclic aromatic hydrocarbons of this invention. Additionally, the envisaged substrates of this prior art are clearly volatile at reaction temperatures and the reaction chamber is thus necessarily provided with a membrane that is highly selective for the passage of hydrogen as compared to the other volatile reaction components which are retained in the reaction chamber.

N. Kariya et al have recently reported in Applied Catalysis A, 233, 91–102 (2002) what is described to be an efficient generation of hydrogen from liquid cycloalkanes such as cyclohexane, methylcyclohexane and decalin over platinum and other platinum-containing catalysts supported on carbon. The process is carried out at from about 200° C. to 400° C. under "wet-dry multiphase conditions", which involves intermittently contacting the saturated liquid hydrocarbon with the heated solid catalyst in a way such that the catalyst is alternately wet and dry. Because of local superheating and other cited factors the dehydrogenation reaction is rendered more efficient in terms of improved reaction kinetics but still requires the use of relatively high temperatures. This basic process is elaborated on in several Japanese patent applications (e.g. JP20001110437 and JP2002134141) where it is applied citing benzene, toluene, xylene, mesitylene, naphthalene, anthracene, biphenyl, phenanthrene and their alkyl derivatives as possible aromatic substrates as a means of producing hydrogen for fuel cells. It is evident however, that for this and other implementations of the process, active means for totally separating the product hydrogen from the volatile components of the process need to be employed.

R. O. Loufty and E. M. Vekster, in "Investigation of Hydrogen Storage in Liquid Organic Hydrides", Proceedings of the International Hydrogen Energy Forum 2000, Munich Germany, 2000; pp. 335–340, have reported the dehydrogenation of decalin in a membrane reactor where the very low conversion (~15%) of decalin, even at 300° C., is greatly enhanced by the selective separation of hydrogen by the membrane and its removal from the reactor.

BRIEF SUMMARY OF THE INVENTION

The present invention provides a means of capturing and thereby storing hydrogen by its chemical reaction, conducted at moderate temperatures, in the presence of a catalyst, with a substrate having an extended pi-conjugated molecular structure to yield the corresponding substantially hydrogenated form of the pi-conjugated system. As used herein, "hydrogenate", including in its various forms, means to add hydrogen to saturate unsaturated bonds, and does not include hydrogen cleavage of molecules or hydrogenolysis (ie. breaking of carbon-carbon or carbon-heteroatom linkages). A delivery of the stored hydrogen is accomplished simply by reducing the pressure of hydrogen, and/or raising the temperature, both of which promote the corresponding dehydrogenation reaction. The pi-conjugated substrates of our invention can be reversibly catalytically hydrogenated at milder reaction conditions and with a lesser expenditure of energy than those of the prior art, i.e. principally benzene, toluene and naphthalene. The extended pi-conjugated substrate and its hydrogenated derivative are relatively large molecules, and are therefore relatively involatile, thus being easily separable from the product hydrogen stream. While a high degree of hydrogenation and dehydrogenation is advantageous to be an effective and practical hydrogen storage system, at least partial hydrogenation and dehydrogenation, preferably wherein the reversible hydrogen uptake of the extended pi-conjugated substrate is at least 1.0% of by weight of the at least partially hydrogenated substrate, yields an effective and practical hydrogen storage economy.

As demonstrated herein by quantum mechanics based thermodynamics calculations and supporting experimental data, a reversible hydrogenation of larger or extended pi-conjugated aromatic molecules is generally thermodynamically more favorable; it can be carried out at a lower temperature than is possible with the commonly used one, two, or three six-membered ring aromatic substrates of the prior art. Essentially, the modulus of the heat or enthalpy of the (exothermic) hydrogenation reaction and of the (endothermic) dehydrogenation step is reduced, thus resulting in a hydrogenation/dehydrogenation system which is more easily reversible at modest and practical temperatures. An added advantage of using the extended or large pi-conjugated substrates is that they and their hydrogenated derivatives are far less volatile, thus precluding the need for a separate unit operation for totally separating these from the product hydrogen thus greatly simplifying the overall hydrogen storage equipment and its process of operation.

DETAILED DESCRIPTION OF THE INVENTION

Figure 1:
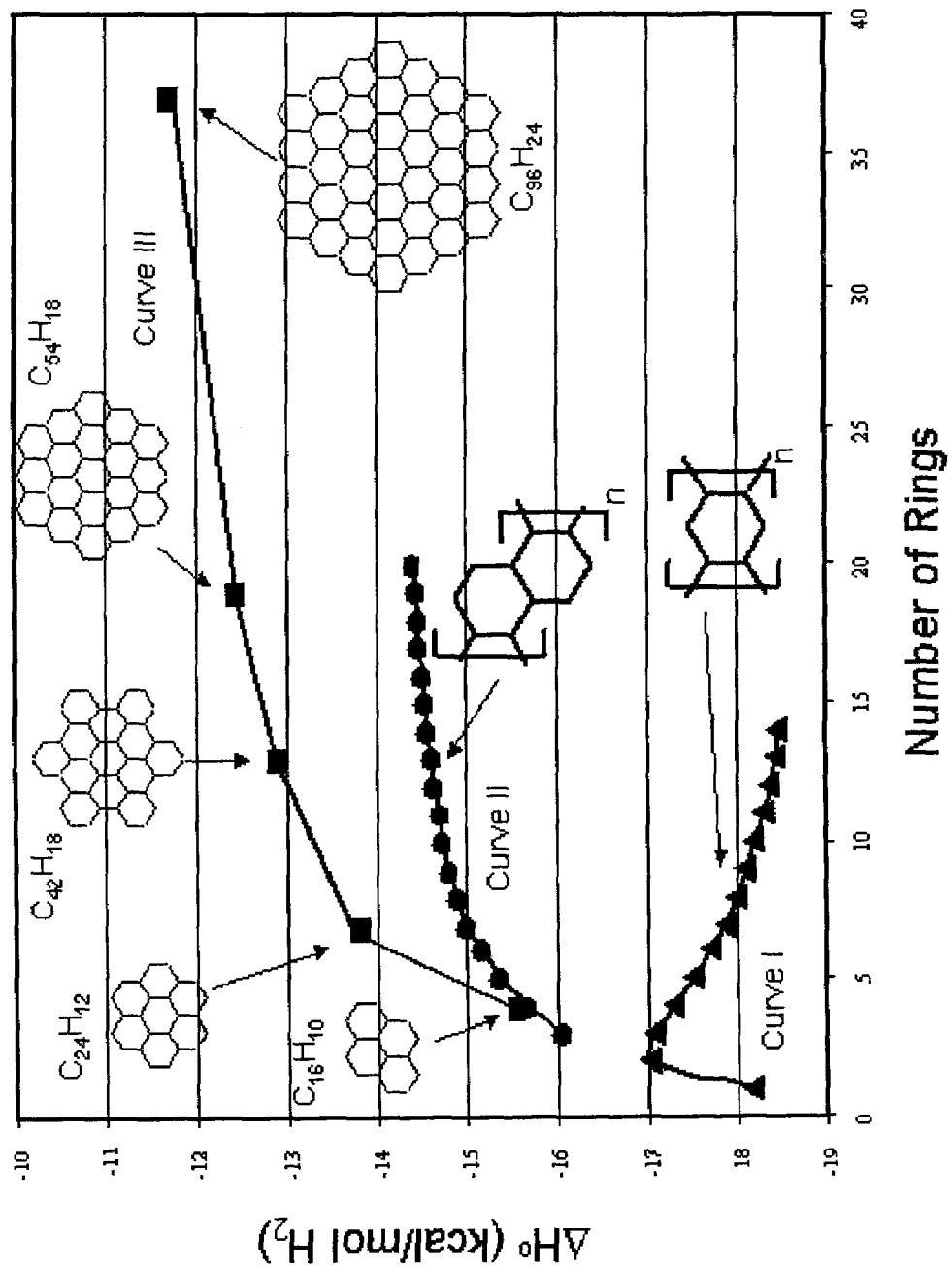
FIG. 1 is a plot of the calculated standard enthalpies of hydrogenation ($\Delta H°$) for three structural classes of polyaromatic hydrocarbons as a function of the number of fused aromatic rings (the representations of double bonds, or aromatic sextets, have been omitted for simplicity).

Provided herein is a process for the storage of hydrogen by its reversible chemical reaction with extended pi-conjugated substrates. It may be performed with extended, or large, pi-conjugated molecular structures as herein defined and with reaction parameters, as illustrated by the following computational and experimental examples.

Pi-conjugated (often written in the literature using the Greek letter Π) molecules are structures which are characteristically drawn with a sequence of alternating single and double bonds. But this representation of the chemical bonding is only a means of recognizing such molecules by their classical valence bond structures. It does not alone provide a description of their useful properties in the context of this invention for which concepts of modern molecular orbital theory of bonding need to be invoked.

In molecular orbital theory, the classically written single bond between two atoms is referred to as a σ-bond, and arises from a bonding end-on overlap of two dumbbell shaped "p" electron orbitals. It is symmetrical along the molecular axis and contains the two bonding electrons. In a "double" bond, there is, in addition, a side-on overlap of two "p" orbitals that are perpendicular to the molecular axis and is described as a pi-bond (or "Π-bond"). It also is populated by two electrons but these electrons are usually less strongly held, and more mobile. A molecule that comprises (is depicted as) a sequence of alternating single and double bonds is described as a "pi-conjugated system" in the sense that the pi-electrons of the double bonds can be delocalized over this sequence for the entire molecule. The consequence of this is that the pi-conjugated molecule has a lower overall energy, i.e. is more stable than if its pi-electrons were confined to or localized on the double bonds. This is well evident experimentally in the simplest pi-conjugated system, trans-1,3-butadiene. The heat (enthalpy) change at standard conditions (1 atm. pressure, 25° C.) for hydrogenating the two double bonds to yield butane is −56.24 kcal/mole as compared to a total of −60.06 kcal/mole for hydrogenating two molecules of 1-butene to the same end product. Thus, 1,3-butadiene is more stable by 3.82 kcal/mol because of the internal conjugation, as evidenced by the lower modulus (absolute value) of the negative enthalpy of hydrogenation. A much larger stabilization from pi-conjugation of 35.6 kcal/mol can be calculated in the same way for benzene compared to cyclohexane and is referred to as its aromatic stabilization energy.

The practical consequence of this additional stability that can be achieved with extended pi-conjugated substrates is that it brings these closer in energy to their corresponding saturated or fully hydrogenated derivatives, making possible hydrogen storage via catalytic hydrogenation/dehydrogenation processes that are more easily reversible at mild temperatures and are less energy intensive.

This concept can be quantified in terms of the basic thermodynamic parameters, enthalpy (ΔH), entropy (ΔS), Gibbs free energy (ΔG), and the equilibrium constant K, for the reversible hydrogenation reaction of substrate A to $A-H_{2n}$:

by the familiar thermodynamic relationship:

$$\Delta G = -RT \ln K = \Delta H - T\Delta S \quad (1)$$

where R is the ideal gas constant, T is the reaction temperature (K), and where $K=[A-H_2]/[A]P''_{H2}$ where the terms in [ ] refer to concentration and $P_{H2}$ designates the hydrogen partial pressure. (2)

For an ideally reversible process, ΔG should ideally be about zero at a temperature (T) of ~80° C., the approximate temperature of operation of present day polymer electrolyte membrane (PEM) fuel cells, but there is a considerable latitude around this criterion.

For the hydrogenation of benzene to cyclohexane, a system which has been described in the prior art for hydrogen storage, the experimental enthalpy change at standard conditions (1 atm. pressure gas, 25° C.), ΔH°, is −16.42 kcal/mol $H_2$; ΔG at 80° C. is −6.17 kcal/mol $H_2$, with a corresponding $K=2.91 \times 10^{11}$ atm$^{-1}$ and approaches the ideal zero value only at about 280° C. (where K=1.1 atm$^{-1}$).

For the hydrogenation of naphthalene (liquid), $C_{10}H_8$, to cis-decalin (liquid), $C_{10}H_{18}$, (which has also been investigated as a hydrogen storage system), the experimental ΔH°=−15.13 kcal/mol $H_2$ and ΔG at 80° C. is −4.87 kcal/mol $H_2$ and approaches zero only at about 235° C. (where K=0.8 atm$^{-1}$). Therefore, it is very clear that with the reversible hydrogenation systems of the prior art a recovery of hydrogen that is stored by hydrogenation will only be possible at quite elevated temperatures. And in addition, as noted earlier, these prior art systems all comprise highly volatile components, which would require another unit operation for their separation from hydrogen.

Described here are extended pi-conjugated substrates which can advantageously be reversibly hydrogenated at much milder conditions and are not appreciably volatile, thus precluding the need of a complex separation process for the evolved recovered hydrogen. These hydrogenated extended pi-conjugated substrates can be dehydrogenated at temperatures below about 250° C. while at hydrogen partial pressures of greater than about 1.449 psia (0.1 bar) and even at pressures in excess of 14.49 psia (1.0 bar) as will be shown by the examples. This is highly unexpected since temperatures required to effect dehydrogenation increase significantly with increasing hydrogen partial pressures. An added advantage of the extended pi-conjugated substrates of this invention is the relative involatility of the substrate, both in hydrogenated and dehydrogenated states, as this eases the separation of the released hydrogen for subsequent usage.

From Equation 1, the ideal requirement of $\Delta G \sim 0$ would be met with $\Delta H \sim T\Delta S$. The entropy change for a hydrogenation ($\Delta S$) of pi-conjugated substrates, which is largely representative of the loss of the $H_2$ molecules' translational entropy, is typically on the order of ~30 cal/deg/mol $H_2$. Thus, for $\Delta G=0$ at 80° C., AH should be about −10.6 kcal/mol $H_2$; at 200° C., $\Delta H$ will be approximately −14.2 kcal/mol $H_2$; and at 250° C., $\Delta H$ will be approximately −15.7 kcal/mol $H_2$. For a practical hydrogen storage device that operates via a reversible hydrogenation of a pi-conjugated system, the change in enthalpy at standard conditions (referred to hereinafter as $\Delta H°$ with standard conditions being 25° C. and 1 atm.) of hydrogenation of the substrate as determined experimentally should be within the range of about −7.0 to about −15.0 kcal/mol $H_2$, (a range of hydrogenation enthalpies enthalpy changes that does not encompass the $\Delta H°$ for benzene or the $\Delta H°$ for naphthalene to their corresponding hydrocarbons). Those substrates having a lower modulus (absolute value) of the negative standard enthalpy change of hydrogenation, will be more easily dehydrogenated.

A difficulty in defining such suitable pi-conjugated substrates is that experimentally derived hydrogenation enthalpy change data is available only for relatively small pi-conjugated molecules. Our basis for defining the following classes of extended pi-conjugated substrates suitable for the reversible hydrogenation/dehydrogenation processes of our invention in terms of their enthalpy of hydrogenation is derived from quantum mechanical (QM) calculations that utilize the widely available PM3 (Parametric Method 3) semi-empirical QM algorithm. While the calculations are expected to provide the heat of formation, $\Delta H°_f$, for the molecule in an ideal gas state, and $\Delta H°$ values as the standard enthalpy change, that are within a few kcal/mol of experimental values, more significantly the calculated values provide reasonably accurate relative values and thus the correct trend over a range of molecules which should be quite reliable. In conducting the calculations, all structures were first fully optimized in their molecular geometry by an energy minimization procedure and the standard enthalpy of formation for the molecule, $\Delta H°_f$, or heat of formation was obtained using PM3. The conformation of the hydrogenated species was carefully chosen so that the adjacent hydrogen atoms are present alternatively at opposite sides of the aromatic planes; the ultimate criteria being a selection of the conformer of lowest energy. It is known that PM3 incorrectly yields the heat of formation for the $H_2$ molecule. However, by replacing it with the experimental value of the heat of formation for $H_2$ at its standard state, we obtain the value of heat of reaction at standard conditions, $\Delta H°$, for hydrogenation that is in good agreement with the available experimental data. For example, for hydrogenation of benzene (gas) to cyclohexane (gas), the calculated value of $\Delta H°$ is −18.16 kcal/mol $H_2$ (exp. −16.42 kcal/mol $H_2$); for hydrogenation of naphthalene (gas) to trans-decalin (gas), the calculated value is −17.03 kcal/mol $H_2$ (exp. −15.96 kcal/mol $H_2$). Similar accuracy was also found for other aromatic compounds. The calculations for the geometry optimization and the calculated standard enthalpies of formation were carried out using the commercial software program package Spartan02 by Wavefunction Inc. Experimentally derived values of the hydrogenation enthalpies were calculated from published thermodynamic data and procedures using the HSC5 Chemistry for Windows software program package (Outokumpu Research, Finland). Experimentally determined values for the hydrogenation enthalpies can be obtained from measuring the heat of combustion of hydrogenated and dehydrogenated substrates to products of known thermodynamic properties (ie. $CO_2$, $H_2O$, NO, or $N_2$).

For purposes of this description and the claims, "extended pi-conjugated substrates" are defined to comprise polycyclic polyaromatic molecules for which the modulus of the standard enthalpy change of hydrogenation of the extended pi-conjugated substrate, $\Delta H°$, to their corresponding saturated counterparts is less than about −15.6 kcal/mol $H_2$, (as calculated by the PM3 method). Generally such calculated standard enthalpy changes of hydrogenation of the extended pi-conjugated substrates of this invention, $\Delta H°$, will be within the range of from −8 to −15.6 kcal/mol $H_2$. When the standard enthalpy changes of hydrogenation of the extended pi-conjugated substrates of this invention are determined experimentally by conventional techniques, the modulus of the standard enthalpy change of hydrogenation of the extended pi-conjugated substrate will be below about 15.0 kcal/mol $H_2$, Accordingly, such molecules would therefore be suitable as reversible hydrogenation substrates for storing hydrogen according to this invention. In terms of chemical structural formulae, "extended pi-conjugated substrates" are also defined for the purposes of this description and the claims to include, as such classes are hereinafter defined, large polycyclic aromatic hydrocarbons; polycyclic aromatic hydrocarbons with nitrogen or oxygen heteroatoms; polycyclic aromatic hydrocarbons with ketone groups in the ring structures; pi-conjugated aromatic molecules comprising five membered rings; pi-conjugated aromatic molecules comprising six and five membered rings with nitrogen or oxygen heteroatoms; and pi-conjugated organic polymers and oligomers. While the extended pi-conjugated substrates useful for reversible hydrogenation in accordance with this invention are represented as the unhydrogenated form of the substrate molecule, the actual substrate subjected to hydrogenation may already have some degree of hydrogenation. For purposes of the hydrogenation/dehydrogenation cycle to store and release hydrogen and to re-hydrogenate the substrate, the extended pi-conjugated substrate may exist and be cycled between different levels of full or partial hydrogenation and dehydrogenation as to either the individual molecules or as to the bulk of the substrate, depending upon the degree of conversion of the hydrogenation and dehydrogenation reactions. The levels of hydrogenation and dehydrogenation of the starting extended pi-conjugated substrate and the at least partially hydrogenated extended pi-conjugated substrate will be selected to provide the requisite level of hydrogen storage and release under practical operating conditions and requirements. The substrates useful according to this invention may also have various ring substituents, such as n-alkyl, alkyl, alkoxy, ether and poly-ether groups, which may improve some properties such as melting temperature of the substrate while at the same time not materially interfering with the hydrogen storage capacity of the substrate. Preferably, any of such substituent groups would have 12 or less carbons.

Such classes of extended pi-conjugated substrates suitable for the processes of this invention are further and more specifically defined as follows.

Large Polycyclic Aromatic Hydrocarbons (LPAH's). For the purposes of this description and the claims, large polycyclic aromatic hydrocarbons are defined to be those molecules which comprise a polycyclic aromatic hydrocarbon comprising a fused ring system having at least four rings wherein at least two of such rings of the fused ring system are represented as six-membered aromatic sextet structures. The four ring prototypes are triphenylene (9,10-benzophenanthrene), chrysene (1,2-benzophenanthrene), and pyrene. The LPAH molecules represent a particular class of extended pi-conjugated substrates since their pi electrons are largely delocalized over the molecule. While, on a thermodynamic basis, generally preferred are the larger molecules (i.e. those with considerably more than four rings), the value of the standard enthalpy change of hydrogenation, $\Delta H°$, and thus the ease of reversible hydrogenation can be very dependent on the "external" shape or structure of the LPAH molecule. Fundamentally, the LPAH molecules that have the highest aromatic resonance stabilization energy will have the lowest modulus (absolute value) of the standard enthalphy of hydrogenation, $\Delta H°$. As is taught by E. Clar in "Polycyclic Hydrocarbons" Academic Press, 1984, Chapter 6, it is a general principle that the stability of isomers of fused ring substrates increases with the number of aromatic sextets. For instance anthracene

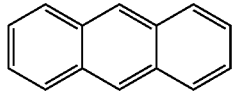

has one aromatic sextet (conventionally represented by three alternating single and double bonds in a single ring or by an internal circle), as for benzene, while phenanthrene,

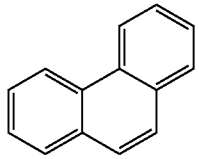

has two aromatic sextets, with the result that phenanthrene is more stable by 4.4 kcal/mol (based on the molecules' relative heats of formation).

Thus, according to this invention, for a LPAH of a given number of fused rings the structural isomer that is represented with the largest number of aromatic sextets will be preferred as a hydrogenation/dehydrogenation extended pi-conjugated substrate. LPAH's with a large number of aromatic sextets are preferred structures in accordance with this invention. These two criteria provides a useful but only qualitative indication of the relative $\Delta H°$ of hydrogenation of a series of LPAH isomers and LPAH molecules of varying size.

Quantum mechanics calculations utilizing the PM3 methodology provide a more useful and quantitative prediction of the $\Delta H°$ values for hydrogenation as summarized in FIG. 1 for the represented molecules.

In FIG. 1, Curve 1 shows the variation of $\Delta H°$ of hydrogenation for a series of linear polyacenes for which the first three members are benzene, naphthalene, and anthracene. The heat, or enthalpy, of hydrogenation reaches its least negative value at naphthalene (2 rings) and becomes increasingly more negative with an increasing number of aromatic rings. We have discovered that fusing the aromatic rings in a staggered ("armchair") linear arrangement results in a less negative $\Delta H°$ of hydrogenation as the number of rings increases (FIG. 1, Curve II). We have observed a more pronounced effect of fused ring number on $\Delta H°$ of hydrogenation for a series of roughly circular polyaromatic hydrocarbons (FIG. 1, Curve II). Increasing the number of fused rings from pyrene (4 rings) to coronene (7 rings) results in a decrease of 1.72 kcal/mol $H_2$ in the $\Delta H°$ of hydrogenation. This curve portraying larger and still larger polyaromatic hydrocarbons suggests that the $\Delta H°$ of hydrogenation of a single sheet of graphite will be of the order of about -8 to about -11 kcal/mol $H_2$ and represents the ultimate in large molecular size (if not the ideal) potentially reversibly hydrogenable polyaromatic hydrocarbons. The large effect of polyaromatic hydrocarbon shape on the $\Delta H°$ of hydrogenation can also be illustrated by comparing the $\Delta H°$ of hydrogenation values for three 13-ring polyaromatic hydrocarbons in FIG. 1. There is a span of over 5.5 kcal/mol $H_2$ between the $\Delta H°$ of hydrogenation of hexabenzocoronene ($C_{42}H_{18}$, -12.91 kcal/mol $H_2$)

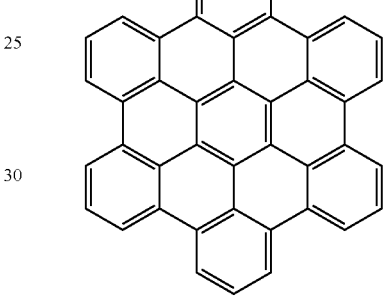

and the also 13-ring linear polyacene of curve 1 of FIG. 1 for which the $\Delta H°$ of hydrogenation is -18.43 kcal/mol $H_2$.

Other members of this class of large polycyclic aromatic hydrocarbons particularly useful according this invention as extended pi-conjugated substrates are perylene, coronene, ovalene, picene and rubicene.

Polycyclic Aromatic Hydrocarbons with Nitrogen or Oxygen Heteroatoms. For the purposes of this description and the claims, polycyclic aromatic hydrocarbons with nitrogen or oxygen heteroatoms are defined to be those molecules which comprise a polycyclic aromatic hydrocarbon comprising at least 2 fused rings and at least one ring is represented as a six-membered aromatic sextet structure and at least one ring contains a nitrogen or oxygen heteroatom. As used throughout this description and the claims, "heteroatom" is an atom other than carbon replacing a ring carbon atom in a carbon ring structure.

Figure 2:
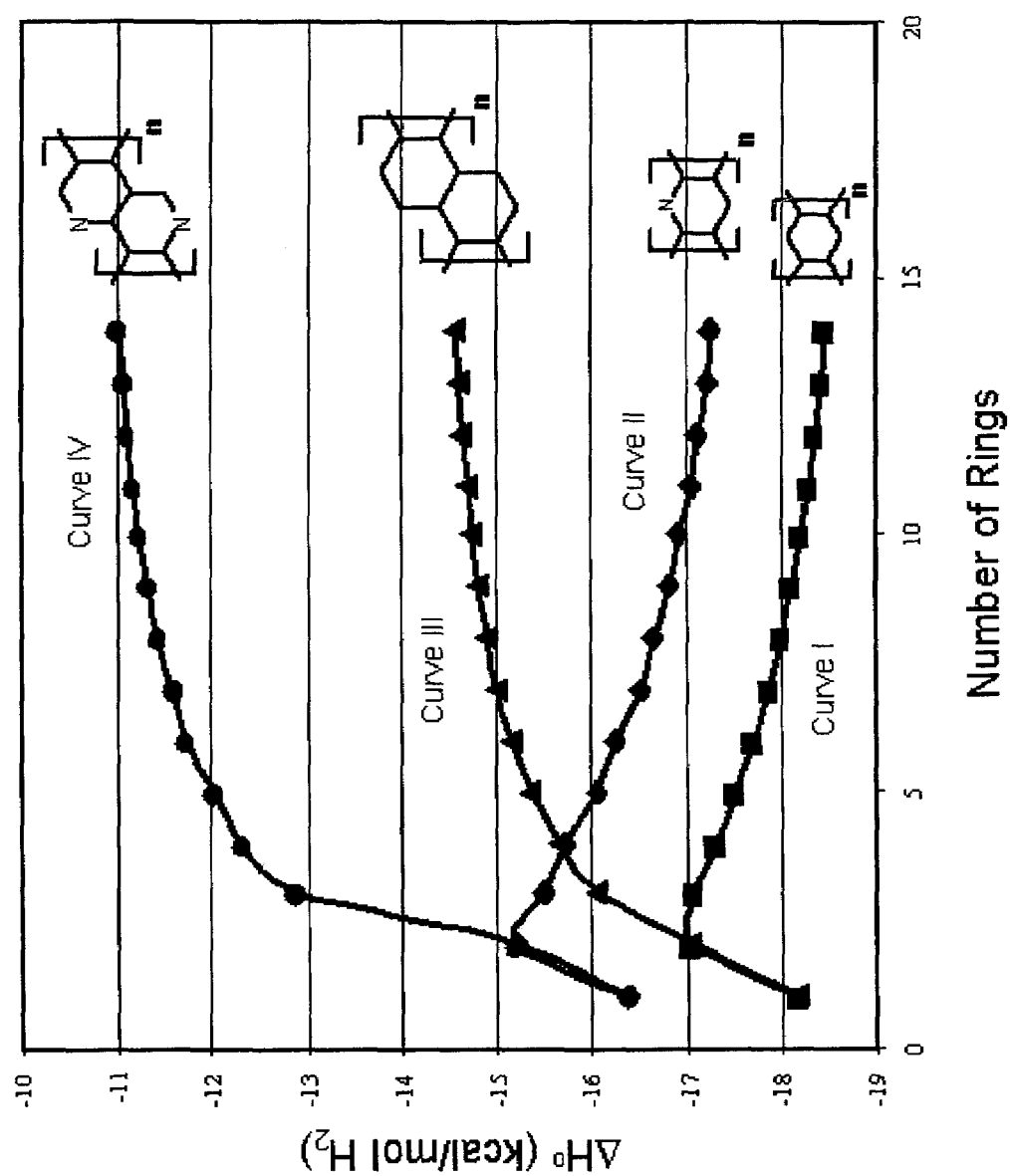
FIG. 2 is a plot of the calculated standard enthalpies of hydrogenation ($\Delta H°$) for two isostructural series of polyaromatic hydrocarbons, with and without nitrogen substitution, as a function of the number of fused aromatic rings (the representations of double bonds, or aromatic sextets, have been omitted for simplicity).

Pyridine is known to have a greater aromatic stabilization energy than benzene and an introduction of N heteroatoms replacing carbons in polycyclic aromatic hydrocarbons also generally results in a lower modulus (absolute value) of the standard enthalpy of hydrogenation, $\Delta H°$, i.e. a higher aromatic (or pi-conjugation) stabilization energy than their corresponding all carbon counterparts as illustrated in FIG. 2. The substitution of a nitrogen heteroatom for a carbon atom in a six membered sextet structure ring results in retention of the sextet structure. We have observed an even more remarkable decrease in standard enthalpy of hydrogenation, $\Delta H°$, for the staggered ("armchair") linear polyaromatic hydrocarbon with the substitution of one N heteroatom per aromatic ring. For the series of staggered ("armchair") linear polyaromatic hydrocarbon from 3 to 14 rings, (Curves III and IV in FIG. 2) there is an approximately 3.5 kcal/mol $H_2$ less negative $\Delta H°$ when one of the carbon atoms per ring is replaced by a nitrogen atom. And once again, we have observed that the overall external "shape" of the molecule can greatly affect the standard enthalpy of hydrogenation, $\Delta H°$. The N heteroatom polycyclic hydrocarbons that contain the greatest number of pyridine-like aromatic sextets will be the most preferred, lowest modulus of the standard enthalpy of hydrogenation, structures. The incorporation of two N atoms in a six membered ring, replacing carbons, provides an even further advantage, the effect of $\Delta H°$ depending on the nitrogens' relative positional substitution pattern. A particularly germane example is provided by 1,4,5,8,9,12-hexaazatriphenylene, $C_{18}H_6N_6$,

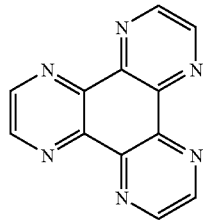

and its perhydrogenated derivative, $C_{12}H_{24}N_6$ system

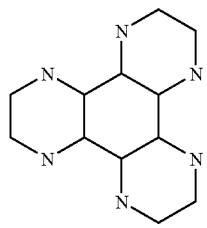

for which the calculated $\Delta H°$ of hydrogenation is $-12.9$ kcal/mol $H_2$ as compared to $-15.5$ kcal/mol $H_2$ for the corresponding all carbon triphenylene, perhydrotriphenylene system.

An example of a polycyclic aromatic hydrocarbon with an oxygen heteroatom is dibenzofuran, $C_{12}H_8O$,

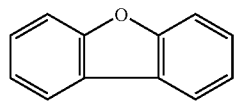

for which the calculated the $\Delta H°$ of hydrogenation is $-15.45$ kcal/mol $H_2$.

Other members of this class of polycyclic aromatic hydrocarbons with nitrogen or oxygen heteroatoms are phenanthroline, quinoline, and acridine.

Polycyclic Aromatic Hydrocarbons with Ketone Groups in the Ring Structure. For the purposes of this description and the claims, polycyclic aromatic hydrocarbons with ketone groups in the ring structure are defined to be those molecules with at least two fused carbon ring structures wherein at least one of such carbon ring structures comprises a ketone group in the ring structure and the ring structure with the ketone group is fused to at least one carbon ring structures which is represented as an aromatic sextet.

There are prior art teachings on hydrogen storage utilizing the reversible catalytic hydrogenation of simple ketones, eg. acetone [J. Burfeind DE 100557MA1 (2002)] to the corresponding alcohols, for which the hydrogen storage capacities are relatively low. However, we have discovered that by introducing the hydrogenable ketone substituents into polyaromatic substrates, with which it is conjugated, acceptable heats and hydrogen storage capacities are achievable. Thus for the pigment pyranthrone,

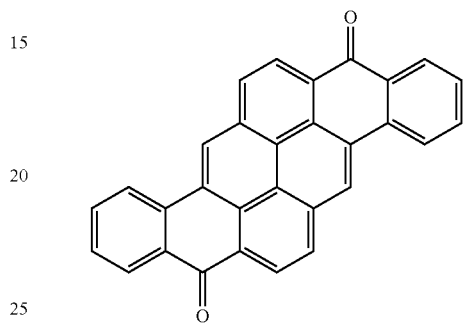

the standard enthalpy of hydrogenation is calculated by the PM3 method to be $-14.4$ kcal/mol $H_2$.

The molecule flavanthrone, a commercial vat dye,

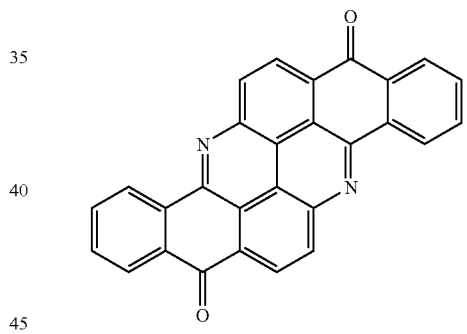

is an example of a polycyclic aromatic that contains both nitrogen heteroatoms and keto groups in the ring structure, and has a favorable hydrogenation $\Delta H°$ of $-13.8$ kcal/mol $H_2$ for the addition of one hydrogen atom to every site including the oxygen atoms.

Pi-conjugated Aromatic Molecules Comprising 5-Membered Rings. For the purposes of this description and the claims, pi-conjugated aromatic molecules comprising 5-membered rings are defined to be those molecules comprising a six-membered aromatic sextet ring fused with a 5-membered ring. We have also discovered that, surprisingly, these pi-conjugated substrates comprising 5-membered rings would provide effective reversible hydrogen storage substrates according to this invention since they have a lower modulus of the $\Delta H°$ of hydrogenation than the corresponding conjugated system in a 6-membered ring. The calculated $\Delta H°$ for hydrogenation of three linear, fused 6-membered rings (anthracene) is $-17.05$ kcal/mol $H_2$. Replacing the center 6-membered ring with a 5-membered ring gives a molecule (fluorene, $C_{13}H_{10}$)

Figure 3:
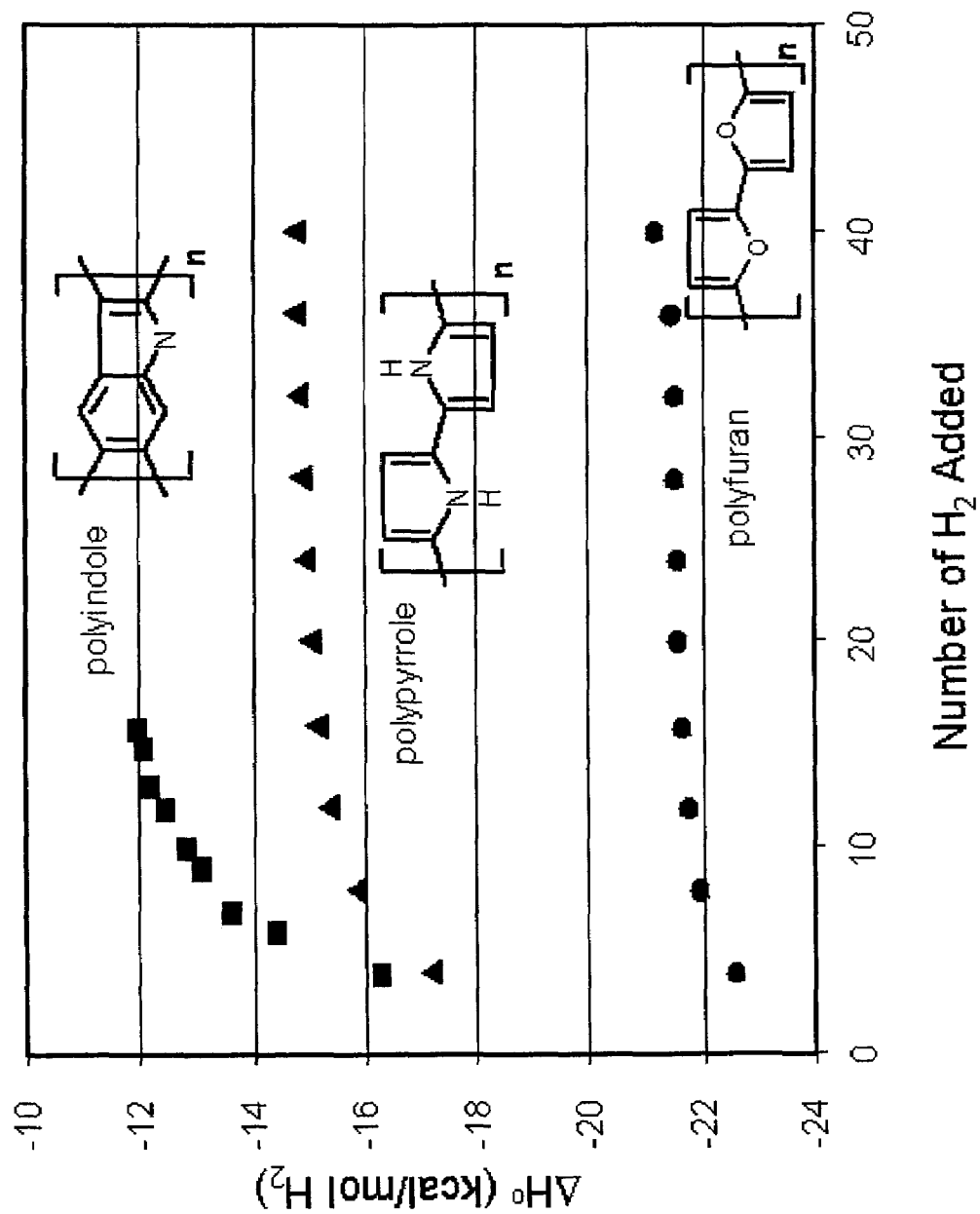
FIG. 3 is a plot of the calculated standard enthalpies of hydrogenation ($\Delta H°$) for three conjugated polymers/oligomers as shown by the formulae for polyindoles, polypyrroles, and polyfurans, as a function of the number of $H_2$ equivalents added.

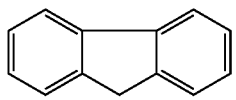

that has a calculated standard enthalpy, $\Delta H°$, of hydrogenation of $-15.43$ kcal/mol $H_2$. As shown by the uppermost curve of FIG. 3, larger molecules repeating the six-membered, five-member ring structure are calculated to have lower, more favorable, modulae of the standard enthalpy, $\Delta H°$, of hydrogenation. Other members of this class of pi-conjugated aromatic molecules comprising 5-membered rings particularly useful according this invention as extended pi-conjugated substrates are indene, and acenanaphthylene.

Pi-conjugated Aromatic Molecules Comprising 6 and 5-Membered Rings With Nitrogen or Oxygen Heteroatoms. For the purposes of this description and invention, pi-conjugated substrates comprising 6 and 5-membered rings with nitrogen or oxygen heteroatoms are defined to be those molecules comprising at least one six-membered aromatic sextet ring fused with a 5-membered ring wherein at least one ring contains a nitrogen or oxygen heteroatom. These molecules essentially are a combination of the large polycyclic aromatic hydrocarbons, polycyclic aromatic hydrocarbons with nitrogen or oxygen heteroatoms, and pi-conjugated aromatic molecules comprising five membered rings substrate classes identified above ( ) and provide the lowest potential modulus of the $\Delta H°$ of hydrogenation and are therefore effective substrates for hydrogenation/dehydrogenation according to this invention. An experimental example of this is provided by carbazole,

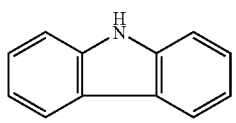

in Example 7, for which the calculated $\Delta H°$ of hydrogenation$=-14.45$ kcal/mol $H_2$.

Another example of a polycyclic aromatic hydrocarbon with an oxygen heteroatom in the five-membered ring fitting this class is dibenzofuran described above.

Pi-conjugated Organic Polymers and Oligomers. For the purposes of this description and the claims, pi-conjugated organic polymers and oligomers are defined as those molecules comprising at least two repeat units containing at least one ring structure represented as an aromatic sextet of conjugated bonds or a five membered ring structure with two double bonds and a heteroatom selected from the goup consisting of nitrogen, oxygen and sulfur. This class of materials represents many organic polymers that are electrical conductors or semiconductors, typically after "doping" with a proton source or an oxidant. While there are often wide variations in the chemical structure of monomers and, often, the inclusion of heteroatoms (eg. N, S, O) replacing carbon atoms in the ring structure in the monomer units, all of these pi-conjugated polymers and oligomers have the common structural features of chemical unsaturation and conjugation. Generally, while the molecules with sulfur heteroatoms may possess the relative ease of dehydrogenation, they may be disfavored in fuel cell applications because of the potential affects of the presence of the sulfur atoms. The chemical unsaturation and conjugation inherent in this class of polymers and oligomers represents an extended pi-conjugated system, and thus these pi-conjugated polymers and oligomers, particularly those with nitrogen or oxygen heteroatoms replacing carbon atoms in the ring structure, are a potentially suitable substrate for hydrogenation. These pi-conjugated organic polymers and oligomers may comprise repeat units containing at least one aromatic sextet of conjugated bonds or may comprise repeat units containing five membered ring structures. Aromatic rings and small polyaromatic hydrocarbon (eg. naphthalene) moieties are common in these conducting polymers and oligomers, often in conjugation with heteroatoms and/or olefins. For example, a heteroaromatic ladder polymer or oligomer containing repeat units such as

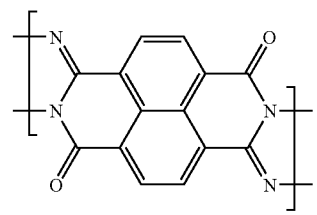

contains a monomer with a naphthalene moiety in conjugation with unsaturated linkages containing nitrogen atoms. We have previously discussed the low modulus of the $\Delta H°$ of hydrogenation associated with polyaromatic hydrocarbon containing five membered rings and conjugated by nitrogen atoms (see carbazole, above). A piconjugated polymer or oligomer formed from a derivatised carbazole monomer repeat unit,

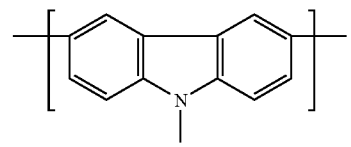

would be expected to demonstrate a low modulus of the $\Delta H°$ of hydrogenation as well. Pi-conjugated polymers and oligomers may also be formed from "pure" carbon-containing monomers and/or polyaromatic hydrocarbons. An example of a pi-conjugated polymer repeat unit of this type is formed from the connection of anthracene through the 9,10 positions of the central aromatic ring.

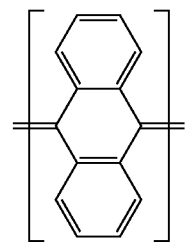

Other members of this class of pi-conjugated organic polymers and oligomers and which are particularly useful according to this invention as extended pi-conjugated substrates are polypyrrole, polyindole, poly(methylcarbazole), polyacenanaphthylene, polyaniline, polyindene and poly(9-vinylcarbazole).

Liquid Extended Pi-Conjugated Substrates. The preferred larger polycyclic aromatic hydrocarbons identified above will for the most part be solids in their relatively pure state at ambient conditions. From Examples 1–7 it is clear that in admixtures with suitable catalysts it is possible, though admittedly surprising, to conduct the hydrogenation and dehydrogenation chemistry well below the melting point of the substrate, and in most of these examples, also well below the melt temperature of hydrogenated substrate.

But it may be preferable to under some circumstances use extended pi-conjugated substrates that are liquid, at least at the hydrogenation and dehydrogenation reaction conditions. In the latter case, the hydrogen storage and release chemistry can be conducted in conventional stirred tank reactors in which mechanical mixing ensures that there is a good mass transfer between the substrate molecules, the dispersed (or dissolved) catalyst, and hydrogen, with minimal mass transfer limitations ensuring rapid kinetics. A liquid phase hydrogenated substrate could be used to safely and economically transport the gas as the hydrogenated pi-conjugated molecule from a large hydrogen plant, where there is the economy of scale, to distribution and use centers where the hydrogen is catalytically liberated from the liquid carrier at mild conditions for use in fuel cells or other devices. Preferably, the substrates, either in their hydrogenated or dehydrogenated states, should have a melting point of lower than about −10° C. in order to be tranferrable in cold weather conditions, and should have a melting point of lower than about 100° C. if they are to be transported or transferred with supplemental heating. Generally, the substrates will be considered for purposes of this invention to be liquid, and thereby transferable, if they have a viscosity of less than about 2000 cSt (centistokes).

One way to render an extended pi-conjugated substrate as a liquid is to utilize mixtures of two or more components one or more of which may comprise an extended pi-conjugated substrate. In some cases, mixtures may form a eutectic mixture. For instance chrysene (1,2-benzophenanthrene, m.p. 250° C.) and phenanthrene, (m.p. 99° C.) are reported to form a eutectic melting at 95.5° C. and for the 3-component system consisting of chrysene, anthracene and carbazole (m.p. 243° C.), a eutectic is observed at 192° C. [Pascal, Bull.Soc.Chim.Fr. 1921, 648.] The introduction of n-alkyl, alkyl, alkoxy, ether or polyether groups as substituents on the ring structures of the polycyclic aromatic molecules, particularly the use such substituents of varying chain lengths up to about 12 carbon atoms, can lower their melting points, but at some cost in "dead weight" and reduced sorbed hydrogen capacity of the systems.

With the growing importance of vehicular fuel cells, and especially polymer electrolyte membrane fuel cells, where operating temperatures are below about 200° C. and therefore easily available heat is also below this temperature, the ability to hydrogenate a substrate having a normal melting point above about 200° C. while present in a mixture having a freezing point of less than about 200° C. would be advantageous, especially where the lowered freezing point mixture was predominantly of two or more of the extended pi-conjugated substrates to provide the maximum reversibility of the hydrogenation/dehydrogenation and highest hydrogen storage capacity. The extended pi-conjugated substrates and mixtures as described above provide such advantages.

As taught by J. C. Fetzer in "Large (C>=24) Polycyclic Aromatic Hydrocarbons" pp. 206–212, coal tar and pitch materials are highly complex mixtures that contain a very large proportion of large polycyclic aromatics. As used herein and in the claims, the term "pitch" will be used to include the complex mixtures often referred to as "tars". The complexity and variety of the large polycyclic aromatic components, including alkyl substituted LPAH's in the pitch presumably results in the observed liquidity. While appropriately selected coal or petroleum-derived pitch compositions could be employed, more preferable "cleaner" (i.e sulfur free) synthetic pitch substrates may be utilized. As described by I. Mochida et al, Carbon 38, 2000, pp. 305–328, and Carbon 26, 1988, pp. 843–852, synthetic pitch consisting of mixtures of dimers to pentamers of naphthalene, anthracene, phenanthrene etc. can be prepared by an $HF/BF_3$ acid-catalyzed condensation, oligomerization of these polycyclic aromatic hydrocarbons. The prepared pitch compositions have softening points which range from 63° C. to 114° C. and even if it proves necessary to add a small amount of a additive (i.e. a low volatility hydrocarbon fluid or some of the hydrogenated liquid LPAH) to increase their fluidity, they represent a class of low volatility liquid LPAH substrates for a storage of hydrogen by their reversible catalytic hydrogenation in accordance with this invention.

We have suggested that large polycyclic aromatic hydrocarbons with nitrogen heteroatoms are particularly preferred because of their expected lower modulus of $\Delta H°$ of hydrogenation. In the above cited article by Mochida (Carbon 28, 2000) a catalytic polymerization of quinoline, and isoquinoline with $AlCl_3$ is said to yield trimers and higher homologs, as mixtures of liquid of nitrogen-containing polycyclic aromatic hydrocarbons which are useful hydrogenation substrates for hydrogen storage in accordance with this invention.

The process of storing hydrogen by a reversible hydrogenation of an extended pi-conjugated substrate in accordance with this invention comprises, in its most general form the following sequence of steps:

a) contacting hydrogen, in the presence of a hydrogenation catalyst under hydrogenation conditions, with an extended pi-conjugated substrate to effect storage of hydrogen by forming an at least partially hydrogenated extended pi-conjugated substrate; and thereafter b) contacting the at least partially hydrogenated extended pi-conjugated substrate under dehydrogenation conditions in the presence of an effective amount of a dehydrogenation catalyst to release hydrogen from the at least partially hydrogenated pi-extended substrate.

In another embodiment of this invention, the hydrogenation catalyst is removed from the at least partially hydrogenated extended pi-conjugated substrate obtained from step a) prior to conducting step b).

As described below in the examples, the hydrogenation and dehydrogenation can be carried out in a single vessel. Hydrogenation catalysts are also known to function as dehydrogenation catalysts and are described herein. Thus the substrate and catalyst, which functions both as hydrogenation catalyst and dehydrogenation catalyst, can be contained in a single vessel and the hydrogenation and dehydrogenation sequentially carried out in the same vessel under appropriate temperature and hydrogen partial pressures.

In another embodiment, the at least partially hydrogenated extended pi-conjugated substrate can be removed from the vessel in which it is hydrogenated and dehydrogenated in another vessel. This is especially preferred where the extended pi-conjugated substrate and the hydrogenated substrate are in a liquid form and so can be transferred and transported as a liquid. Where the hydrogenated and dehydrogenated substrates have a melting point above about −10° C., they can be transported as a liquid in most weather conditions without supplemental heat to keep them liquid. Even if the melting point is up to 100° C., the substrates can still be transferred and utilized as liquids with low level heating.

In order to efficiently contact the hydrogen in the presence of the hydrogenation catalyst with the extended pi-conjugated substrate, which in many cases of the substrates of this invention are relatively involatile solids or liquids at the reaction conditions, it is generally preferred to prepare an intimate physical mixture of the substrate with a hydrogenation catalyst. The substrate, which may be a solid or a liquid, should preferably be sufficiently involatile at least at ambient temperatures and preferably also at the higher temperature reaction conditions so as to preclude the need for its bulk separation or the separation of any of the reaction products or intermediates from the gaseous hydrogen product. It may be necessary however, as a precautionary step in some cases to provide a trap containing an absorbent, which can scavenge and thus remove any trace level volatile containments from the released hydrogen.

Many of the specified suitable substrates, owing to their relatively large molecular size (of usually four or more six-atom rings), will naturally be solids at the preferred reaction temperatures below about 250° C. But as noted above physical (including eutectic) mixtures of a number of these substrates may be liquids, at least at reaction temperatures, which may be advantageous for providing an adequate mixing of the catalyst and reaction components. In such a mixture one of the components may be regarded as being both a solvent and a hydrogenation substrate. As also described above, natural and synthetic pitch materials which consist of a liquid mixture of many large polycyclic aromatic hydrocarbons are seen as suitable substrates.

The hydrogenation catalysts, which are generally known and which will generally function as dehydrogenation catalysts for purposes of this invention, will comprise finely divided metals, and their oxides and hydrides, of Groups 4, 5, 6 and 8, 9, 10 of the Periodic Table according to the International Union of Pure and Applied Chemistry. Preferred are titanium, zirconium of Group 4; tantalum and niobium of Group 5; molybdenum and tungsten of Group 6; iron, ruthenium of Group 8; cobalt, rhodium and iridium of Group 9; and nickel, palladium and platinum of Group 10 of the Periodic Table according to the International Union of Pure and Applied Chemistry. Of these the most preferred being zirconium, tantalum, rhodium, palladium and platinum, or their oxide precursors such as $PtO_2$. These metals may be used as catalysts and catalyst precursors as metals, oxides and hydrides in their finely divided form, as very fine powders or as skeletal structures such as platinum black or Raney nickel, or well-dispersed on carbon, alumina, silica, zirconia or other medium or high surface area supports, preferably on carbon or alumina. Acidic supports, in combination with transition metal dehydrogenation catalysts, or in some cases, the acidic support alone, may be preferable for dehydrogenation catalysts. Examples of acidic supports are silica-alumina, gamma-alumina, zeolites in the proton-exchanged form, sulfonated zirconia, and solid perfluorinated polymeric sulfonic acids. In some cases the dehydrogenation may be catalyzed by solid state Bronsted or Lewis acids in the absence of transition metals. The above listed supports are, for the most part, of the Bronsted or protonic acid types. Suitable Lewis acid catalysts include aluminum trifluoride, aluminum chlorofluorides, zinc chloride, aluminum chloride, tin chloride, copper trifluoromethane sulfonate, scandium trichloride, and the hexafluoroacetylacetonate of complexes of lanthanum and the other members of the Lanthamide series of elements according to the Periodic Table according to the International Union of Pure and Applied Chemistry. Intermetallic hydrides such as $ZnNiH_{2.8}$ and $ZrCoH_{2.8}$ which have been used as either catalysts or catalyst precursors for a hydrogenolysis at very high temperatures (~500° C.) of graphite (to $CH_4$) as described by P. V. Ryabchenko et al in Khimiya Tverdogo Topliva 19, 129–134 (1985) may likewise be used.

Reaction of the pi-unsaturated substrate and catalyst mixture with hydrogen. Traditionally, the catalytic hydrogenation of pi-conjugated substrates (eg. naphthalene, phenanthrene, pyrene, etc. which are solids at room temperature) is carried out with the compounds dissolved in an hydrogenation-inert solvent, containing a slurry of a heterogeneous catalyst. For example, these conditions are described in J. Org. Chem. 4, 2797 (1980), where ethyl acetate was used as the solvent and a 10% palladium on carbon catalyst was employed. Substrates which are liquid at reaction temperature can be hydrogenated in the presence of a contained slurry catalyst. In the case of both solution and liquid substrates a hydrogen overpressure is used and since hydrogen has a very low solubility in the liquid phase it is essential for realizing an adequate mass transfer to stir the mixture, apply an external rocking motion to the reactor or otherwise ensure intimate contact between the hydrogen gas and the substrate/catalyst interface such as by bubbling or sparging the hydrogen through the substrate/catalyst mixture or using the hydrogen to fluidize or ebullate the substrate/catalyst mixture.

In one embodiment of this invention, the extended pi-conjugated substrate, charged into the reactor as solid (together with the solid catalyst) is hydrogenated in the absence of any solvent. This is clearly illustrated by Examples 2–5 where the substrates, coronene and hexabenzocoronene, of melting point 442° C. and 700+° C. are solids even at the reaction temperatures of 140° C. and 200° C. respectively. This gas phase hydrogenation of a solid substrate provides for a new and novel gas/solid hydrogenation process.

This novel gas/solid hydrogenation process can be described as comprising contacting hydrogen gas with a solid extended pi-conjugated substrate as defined in this description in the presence of an effective amount of a hydrogenation catalyst under hydrogenation conditions to at least partially hydrogenate the extended pi-conjugated substrate and more particularly, as a process for the storage of hydrogen comprising contacting hydrogen gas at a hydrogen partial pressure greater than about 100 psia (6.7 bar) and at a temperature of between about 50° C. and about 300° C. with a solid extended pi-conjugated substrate as defined in this description in the presence of an effective amount of a hydrogenation catalyst to at least partially hydrogenate the extended pi-conjugated substrate.

For conducting the dehydrogenation step, the hydrogen gas overhead pressure, usually in the general range of 500–1000 psia, (34.5 bar to 69 bar) for the hydrogenation step, is dropped to about 1.5–50 psia (0.1–3.3 bar), which is generally a sufficient pressure for delivering hydrogen to a fuel cell, with the reactor still at temperature. The increase in hydrogen pressure in the system is monitored as a function of time.

Where possible the calculated total hydrogen uptake and release were confirmed by chemical analyses using nuclear magnetic resonance (NMR) for soluble samples and otherwise by mass spectroscopy. For the relatively highly involatile larger pi-conjugated substrates, matrix-assisted laser desorption mass spectroscopy (MALDI) was found to be invaluable for this purpose.

EXAMPLE 1

Reversible Hydrogenation of Pyrene

A 0.2 g sample of pyrene (>99%, Fluka) and 0.1 g of rhodium on carbon catalyst (5% Rh, Acros Organics) were ground by hand with an agate mortar and pestle until a uniform color mixture was formed. The mixture was then placed in a 50 cc high pressure reactor (Parr instruments) equipped with a customized grinding apparatus. The grinding apparatus consists of an elongated stirrer shaft with an arc-shaped paddle. The bottom of the reactor contains a stainless steel insert with a concave bottom, which allows the paddle of the stirrer shaft to sweep the bottom of the reactor with 1/8" clearance. Mechanical agitation of the sample mixture was performed by adding 5–8 stainless steel ball bearings of varying size (1/16"–1/4" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls are loaded into the reactor, the system is pressurized with helium to 1000 psia (69 bar) and vented. Pressurization and venting with helium is repeated three times. The reactor system is then twice pressurized to 1000 psia (69 bar) hydrogen and vented. Once purging is completed, the sample mixture is hydrogenated by grinding at 95° C. and 1000 psia (69 bar) hydrogen for 1.5 hours. After the reaction time, the reactor is then quickly cooled to room temperature and vented. Half of the sample mixture is removed from the reactor (h-pyrene) and the remaining material is left in the reactor for dehydrogenation. The material to be dehydrogenated is purged as described above and ground at 95° C. and 15 psia (1 bar) hydrogen for three hours before the reactor is cooled to room temperature. The sample is then removed for analysis (dh-pyrene). Both of the hydrogenated pyrene (h-pyrene) and dehydrogenated h-pyrene (dh-pyrene) samples are separated from the catalyst by extraction with chloroform (HPLC grade, Fisher) and filtering of the insoluble catalyst. The chloroform is then removed under vacuum to obtain the pure products. Gas chromatography-Mass spectroscopy (GC-MS) and proton nuclear magnetic resonance (NMR) spectroscopy analyses were performed on the hydrogenated and dehydrogenated h-pyrene. GC-MS indicates that >99% of the pyrene starting material was converted to a mixture of hydrogenated products, having a gravimetric storage capacity for hydrogen of 2.3 wt. % on a total sample weight basis (pyrene+catalyst). Upon dehydrogenation, GC-MS shows that approximately 25% of the hydrogenated material in converted back to pyrene. Proton NMR was used to verify the hydrogenation/dehydrogenation of pyrene. Although the proton NMR spectra are too complex for peak assignment of individual hydrogenated pyrene products, integration of pyrene peak intensity versus new resonances in the spectrum indicate substantial conversion during hydrogenation and partial regeneration of pyrene after dehydrogenation. The following tables show the product distribution of h-pyrene and dh-pyrene calculated from GC-MS from areas normalized for those masses:

TABLE 1

| h-Pyrene Sample Components | Molecular Formula | Percentage of Sample Mixture |
|---|---|---|
| Pyrene | $C_{16}H_{10}$ | 0.5 |
| Dihydropyrene | $C_{16}H_{12}$ | 6.0 |
| Tetrahydropyrene | $C_{16}H_{14}$ | 30 |
| Hexahydropyrene | $C_{16}H_{16}$ | 25 |
| Decahydropyrene | $C_{16}H_{20}$ | 36 |
| Hexadecahydropyrene | $C_{16}H_{26}$ | 2.6 |

TABLE 2

| dh-Pyrene Sample Components | Molecular Formula | Percentage of Sample Mixture |
|---|---|---|
| Pyrene | $C_{16}H_{10}$ | 25 |
| Dihydropyrene | $C_{16}H_{12}$ | 14 |
| Tetrahydropyrene | $C_{16}H_{14}$ | 8 |
| Hexahydropyrene | $C_{16}H_{16}$ | 30 |
| Decahydropyrene | $C_{16}H_{20}$ | 23 |

EXAMPLE 2

Reversible Hydrogenation of Coronene with 5% Rh on Carbon Catalyst and Mechanical Grinding A 0.125 g sample of coronene (95%, Acros Organics) and 0.065 g of rhodium on carbon catalyst (5% Rh, Acros Organics) were ground by hand with an agate mortar and pestle until a uniform dark green mixture was formed. The mixture was then placed in a 50 cc high pressure reactor (Parr instruments) equipped with a customized grinding apparatus. The grinding apparatus consists of an elongated stirrer shaft with an arc-shaped paddle. The bottom of the reactor contains a stainless steel insert with a concave bottom, which allows the paddle of the stirrer shaft to sweep the bottom of the reactor with 1/8" clearance. Mechanical agitation of the sample mixture was performed by adding 5–8 stainless steel ball bearings of varying size (1/16"–1/4" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls are loaded into the reactor, the system was pressurized with helium to 1000 psia (69 bar) and vented. Pressurization and venting with helium was repeated three times. The reactor system was then twice pressurized to 1000 psia (69 bar) hydrogen and vented. The coronene was hydrogenated by heating the sample mixture to 150° C. under 1045 psia (72 bar) hydrogen while the mixture was continuously ground for four hours. The reactor was then quickly cooled to room temperature and vented to atmospheric pressure. The mixture was removed from the reactor, weighed, and half of the material was returned to the reactor for dehydrogenation. The hydrogenated coronene (h-coronene) was removed from the mixture by extracting with chloroform, filtering of the insoluble catalyst, and drying under vacuum. Dehydrogenation was performed by continuous grinding at 150° C. under 15 psia (1 bar) hydrogen for 16 hours. After cooling the reactor to room temperature, the sample mixture was removed from the reactor and the dehydrogenated h-coronene (dh-coronene) was isolated by extraction with chloroform, filtering of the insoluble catalyst, and drying under vacuum. Both of the h-coronene and dh-coronene samples were analyzed by proton NMR and DEP Probe CI (isobutane) mass spectrometry. The coronene parent ion (MW=300) was not present in the mass spectrum of the h-coronene. The mass spectrum mainly consisted of masses 318, 314 and 310. The mass spectrum of dh-coronene shows that the three masses at 310, 314, and 318 have decreased in intensity and a new peak is formed at 300 m/z, the molecular weight of coronene. Assuming that the response factors for each product is similar, a particular ion contribution to the spectrum and the weight increase of coronene upon hydrogenation can be calculated. Upon hydrogenation coronene added 3.5 wt. % hydrogen and 80 percent of those hydrogenated products are converted back to coronene upon dehydrogenation. The irreversible hydrogenated product mainly consists of the mass 318 isomer. Proton NMR spectroscopy is in good agreement with the mass spectroscopy results. The coronene resonance (singlet at 9 ppm) diminishes significantly after hydrogenation while new upfield resonances, assigned to methylene hydrogens, appear. The intensity of the coronene resonance is regained after dehydrogenation while the methylene resonances diminish. The following tables illustrate the relative abundance of each mass signal in the mass spectrum of h-coronene and dh-coronene:

TABLE 3

| h-Coronene Sample Components | Molecular Formula | Percentage of Sample Mixture |
|---|---|---|
| Coronene | $C_{24}H_{12}$ | <1 |
| Decahydrocoronene | $C_{24}H_{22}$ | 2 |
| Tetradecahydrocoronene | $C_{24}H_{26}$ | 27 |
| Octadecahydrocoronene | $C_{24}H_{30}$ | 70 |

TABLE 4

| dh-Coronene Sample Components | Molecular Formula | Percentage of Sample Mixture |
|---|---|---|
| Coronene | $C_{24}H_{12}$ | 92 |
| Octahydrocoronene | $C_{24}H_{20}$ | 0.82 |
| Tetradecahydrocoronene | $C_{24}H_{26}$ | 0.54 |
| Octadecahydrocoronene | $C_{24}H_{30}$ | 6.7 |

EXAMPLE 3

Reversible Hydrogenation of Coronene with 5% Rh on Carbon Catalyst

Figure 4:
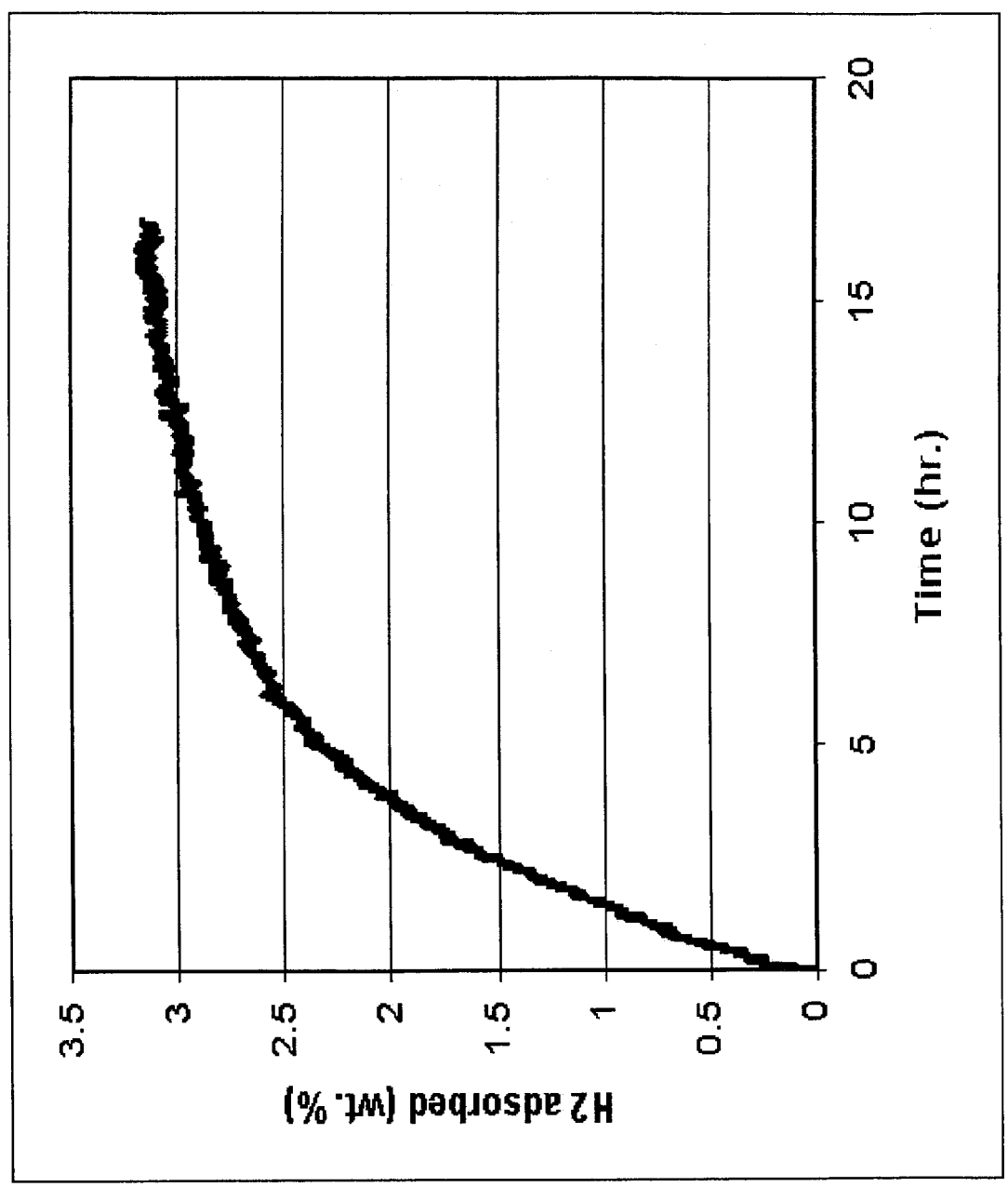
FIG. 4 is a plot of the hydrogen adsorption vs. time of a sample (Example 3) of coronene with 5% Rh on carbon catalyst.
Figure 5:
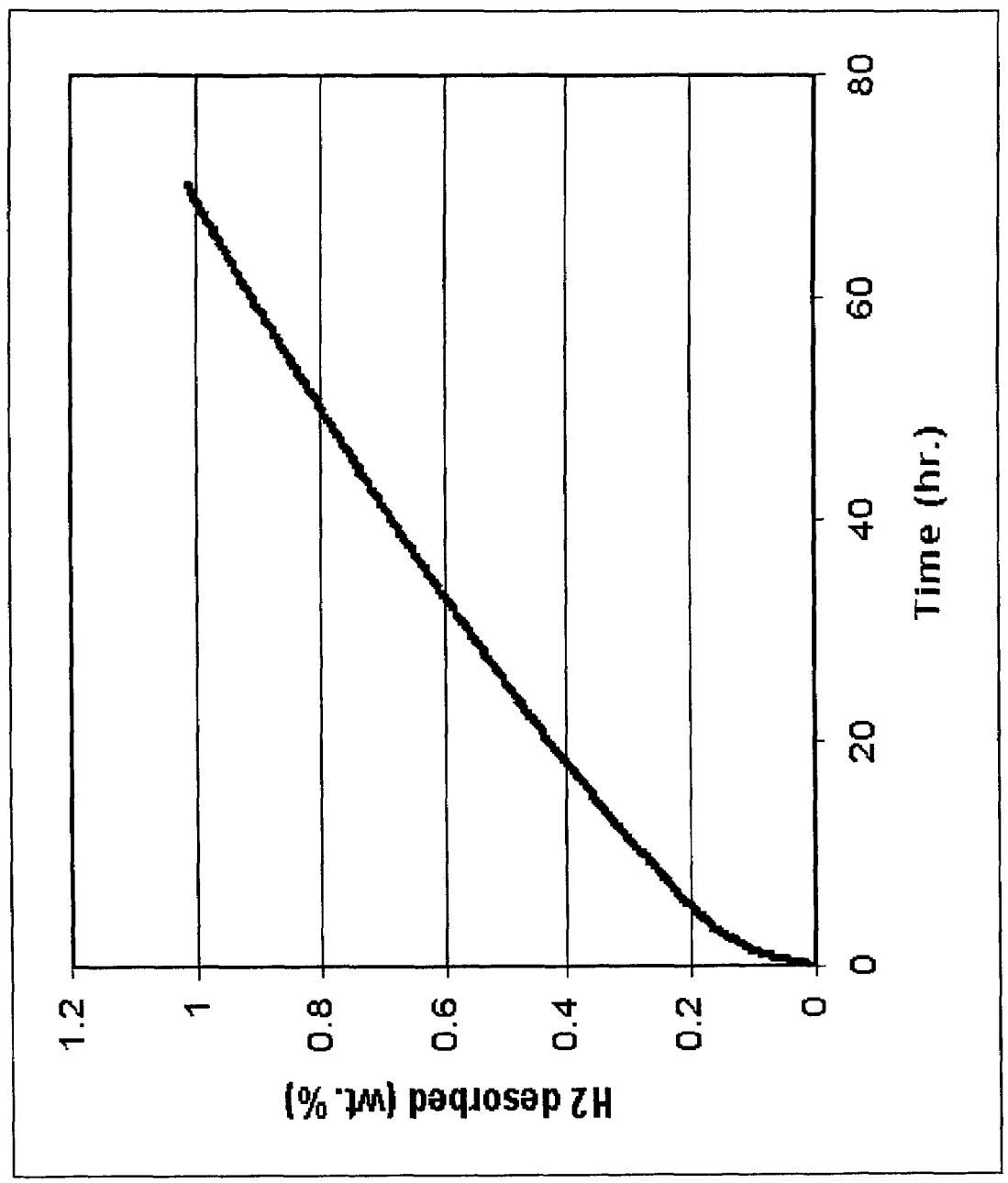
FIG. 5 is a plot of the hydrogen desorption vs. time of a sample (Example 3) of coronene with 5% Rh on carbon catalyst.

A 0.066 g sample of coronene (95%, Acros Organics) and 0.033 g of rhodium on carbon catalyst (5% Rh, Acros Organics) were ground with an agate mortar and pestle for 15 minutes until a uniform dark green mixture was formed. The sample was then placed in a differential pressure adsorption unit. The adsorption unit consists of two identical pressure cells which are spanned by a differential pressure gauge. The absolute pressure of the two cells are measured independently by pressure transducers. Adsorption of hydrogen by the sample is characterized by a relative decrease of the pressure in the sample cell relative to the reference cell while maintaining an identical temperature between the two cells. The sample was degassed at ambient temperature for 30 minutes under vacuum. Both the sample cell and reference cells were placed under 970 psia (67 bar) hydrogen and heated to 150° C. The hydrogen pressure in the sample cell dropped, relative to the reference cell, for a period of 17 hours, indicating adsorption of 3.2 wt. % hydrogen by the sample (FIG. 4). After 17 hours, the cells were cooled to ambient temperature and the pressure in both cells reduced to 20 psia (1.4 bar). Upon heating both cells to 150° C., there was a increase in the pressure of the sample cell relative to the reference cell, indicating desorption of hydrogen from the sample (FIG. 5). After 70 hours, the sample had desorbed 1.0 wt. % hydrogen (31% of the sorbed hydrogen).

EXAMPLE 4

Reversible Hydrogenation of Coronene with Palladium

Figure 6:
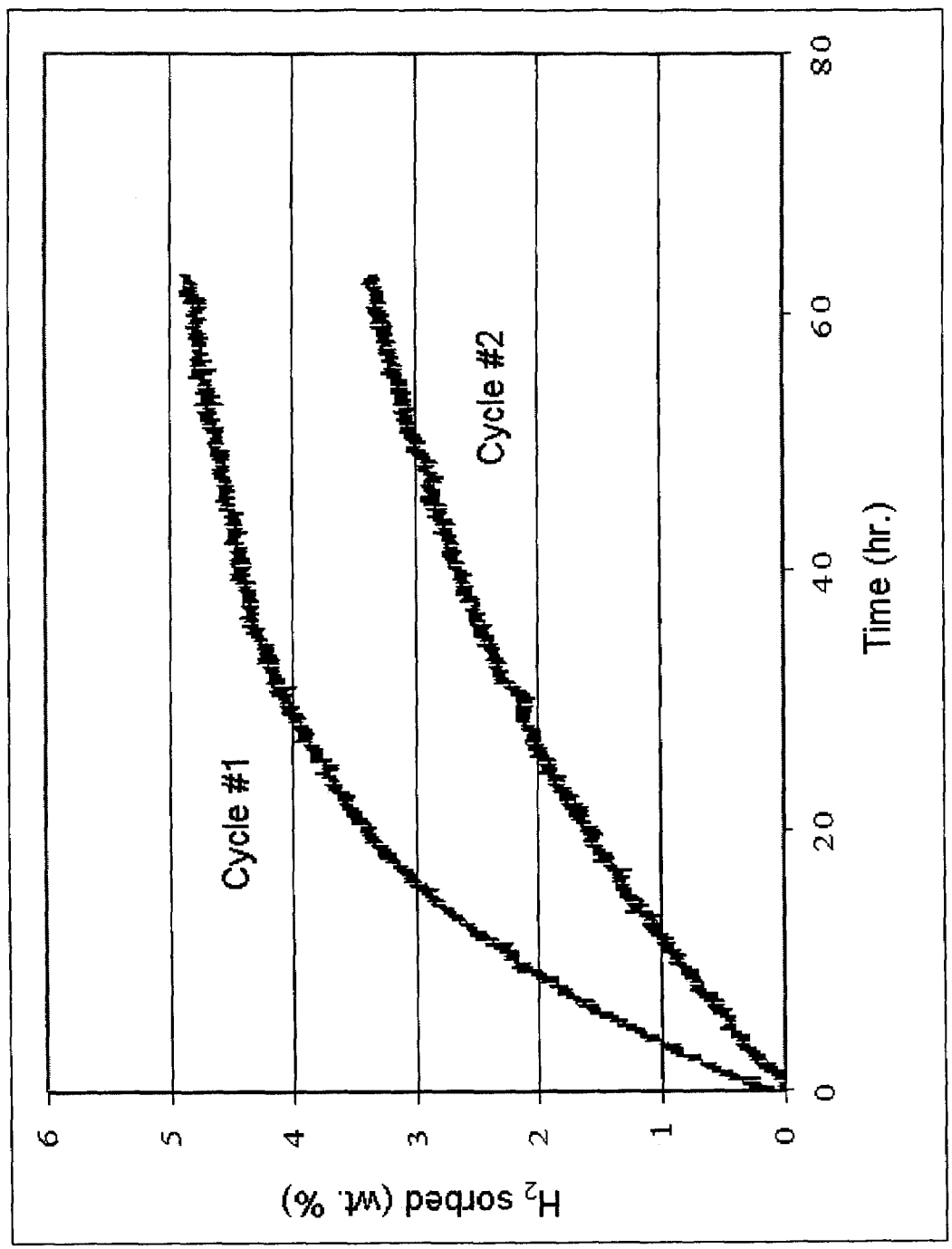
FIG. 6 is a plot of the hydrogen adsorption vs. time, for two consecutive cycles, of a sample (Example 4) of coronene with palladium metal catalyst.
Figure 7:
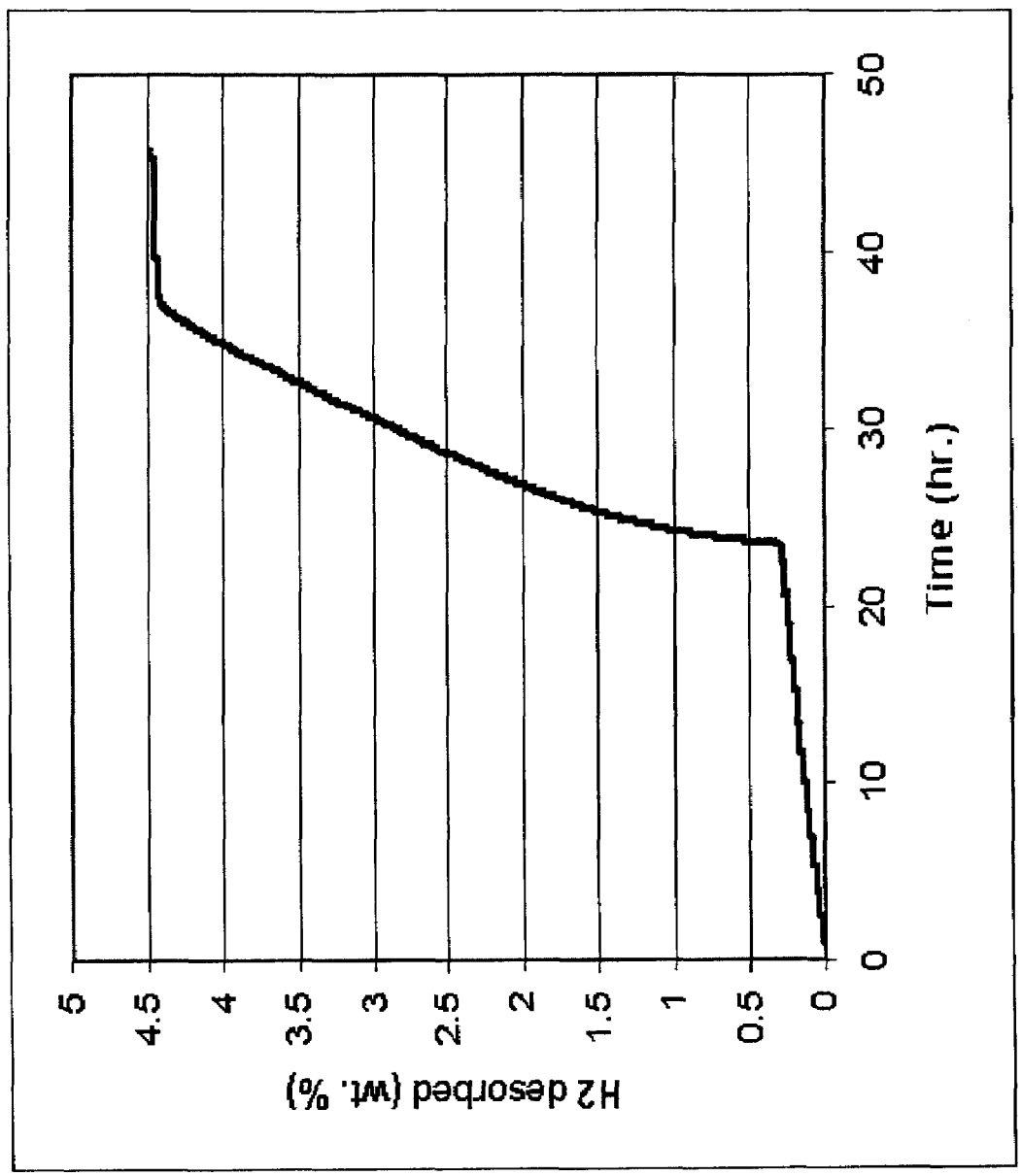
FIG. 7 is a plot of the hydrogen desorption vs. time, cycle #1, of a sample (Example 4) of coronene with palladium metal catalyst.

A 0.1 g sample of coronene (95%, Acros Organics) was impregnated with palladium metal particles by RF sputtering. Subsequent TGA combustion analysis demonstrated a 3% loading of palladium metal in the coronene solid. The sample was then placed in a differential pressure adsorption unit. The adsorption unit consists of two identical pressure cells which are spanned by a differential pressure gauge. The absolute pressure of the two cells are measured independently by pressure transducers. Adsorption of hydrogen by the sample is characterized by a relative decrease of the pressure in the sample cell relative to the reference cell while maintaining an identical temperature between the two cells. The sample was degassed at ambient temperature for 20 minutes under vacuum. Both the sample cell and reference cells were placed under 995 psia (69 bar) hydrogen and heated to 150° C. The hydrogen pressure in the sample cell dropped, relative to the reference cell, for a period of 63 hours, indicating adsorption of 4.9 wt. % hydrogen by the sample (FIG. 6, Cycle #1). After 63 hours, the pressure in both cells was reduced to 20 psia (1.4 bar). After about 24 hours at 150° C., both cells were heated to 200° C. Throughout the period of heating, up to about 40 hours, there was a increase in the pressure of the sample cell relative to the reference cell, indicating desorption of hydrogen from the sample (FIG. 7). After 40 hours, the sample had desorbed 4.5 wt. % hydrogen (92% of the sorbed hydrogen). The cells were then cooled to 150° C. and the hydrogen pressure in both cells was raised to 1005 psia (69 bar). The hydrogen pressure in the sample cell dropped, relative to the reference cell, for a period of 91 hours, indicating adsorption of 3.9 wt. % hydrogen by the sample (FIG. 6, Cycle #2). The pressure was dropped to 20 psia (1.4 bar) and the temperature raised to 200° C. in both cells. Throughout the period of heating, up to about 9 hours there was a increase in the pressure of the sample cell relative to the reference cell, indicating desorption of 3.5 wt. % hydrogen from the sample (90% of the sorbed hydrogen in cycle #2, FIG. 8).

EXAMPLE 5

Reversible Hydrogenation of Hexabenzocoronene (HBC) with 5% Rh on Carbon and Mechanical Grinding A 0.06 g sample of hexabenzocoronene (HBC) and 0.03 g of rhodium on carbon catalyst (5% Rh, Acros Organics) were ground by hand with an agate mortar and pestle until a uniform dark green mixture was formed. The mixture was then placed in a 50 cc high pressure reactor (Parr instruments) equipped with a customized grinding apparatus. The grinding apparatus consists of an elongated stirrer shaft with an arc-shaped paddle. The bottom of the reactor contains a stainless steel insert with a concave bottom, which allows the paddle of the stirrer shaft to sweep the bottom of the reactor with ⅛" clearance. Mechanical agitation of the sample mixture was performed by adding 5–8 stainless steel ball bearings of varying size (¹⁄₁₆"–¼" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls are loaded into the reactor, the system was pressurized with helium to 1000 psia (69 bar) and vented. Pressurization and venting with helium was repeated three times. The reactor system was then twice pressurized to 1000 psia (69 bar) hydrogen and vented. The HBC was hydrogenated by heating the sample mixture to 200° C. under 1130 psia (78 bar) hydrogen while the mixture was continuously ground for eight hours. The reactor was then quickly cooled to room temperature and vented to atmospheric pressure. Half of the sample mixture is removed from the reactor (h-HBC) and the remaining material is left in the reactor for dehydrogenation. The material to be dehydrogenated is purged as described above and ground at 200° C. and 15 psia (1 bar) hydrogen for 16 hours before the reactor is cooled to room temperature. The sample is then removed for analysis (dh-HBC). Both of the hydrogenated HBC (h-HBC) and dehydrogenated h-HBC (dh-HBC) samples were separated from the catalyst by extraction with chloroform and filtering of the insoluble catalyst. The chloroform is then removed under vacuum to obtain the pure products which were analyzed by MALDI mass spectrometry using tetracyanoquinodimethane as the matrix. Upon hydrogenation of HBC (MW=522), a new mass arises at 540 m/z. This new mass accounts for the addition of nine hydrogen molecules. The spectrum of the dehydrogenated h-HBC shows the regeneration of HBC and diminishing of the hydrogenated product at 540 m/z. The conversion of HBC to h-HBC during hydrogenation is approximately 70%, whereas during dehydrogenation the conversion back to HBC from h-HBC is approximately 63%. Thus, the hydrogen storage capacity of HBC during hydrogenation was approximately 2.4 wt. %.

TABLE 5

| h-HBC Sample Components | Molecular Formula | Molecular Weight | Percentage of Sample Mixture |
|---|---|---|---|
| HBC | $C_{42}H_{18}$ | 522 | 28 |
| Hexahydro-HBC | $C_{42}H_{24}$ | 528 | 1 |
| Octadecahydro-HBC | $C_{42}H_{36}$ | 540 | 71 |

TABLE 6

| dh-HBC Sample Components | Molecular Formula | Molecular Weight | Percentage of Sample Mixture |
|---|---|---|---|
| HBC | $C_{42}H_{18}$ | 522 | 86 |
| Hexahydro-HBC | $C_{42}H_{24}$ | 528 | 5.5 |
| Dodecahydro-HBC | $C_{42}H_{30}$ | 534 | 0.65 |
| Octadecahydro-HBC | $C_{42}H_{36}$ | 540 | 8 |

EXAMPLE 6

Reversible Hydrogenation of Coronene with Titanium Hydride and Mechanical Grinding In an argon glovebox, a 0.1 g sample of coronene and 0.047 g of titanium hydride ($TiH_2$, Alfa Aesar) were ground by hand with an agate mortar and pestle until a uniform mixture was formed. In the glovebox, the mixture was then placed in a 50 cc high pressure reactor (Parr instruments) equipped with a customized grinding apparatus. The grinding apparatus consists of an elongated stirrer shaft with an arc-shaped paddle. The bottom of the reactor contains a stainless steel insert with a concave bottom, which allows the paddle of the stirrer shaft to sweep the bottom of the reactor with ⅛" clearance. Mechanical agitation of the sample mixture was performed by adding 5–8 stainless steel ball bearings of varying size (¹⁄₁₆"–¼" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls were loaded into the reactor, the system was pressurized to 1000 psia (69 bar) hydrogen and vented. The Coronene was hydrogenated by heating the sample mixture to 200° C. under 1185 psia (82 bar) hydrogen while the mixture was continuously ground for two hours. The reactor was then quickly cooled to room temperature and vented to atmospheric pressure. The mixture was removed from the reactor and the hydrogenated coronene (h-coronene) was removed from the mixture by extracting with chloroform, filtering of the insoluble catalyst, and drying under vacuum. Proton NMR spectroscopy showed that the coronene resonance (singlet at 9 ppm) diminishes significantly after hydrogenation while new upfield resonances, assigned to methylene hydrogens, appear. The integration of these methylene resonances vs. the unhydrogenated coronene demonstrate a 44% conversion of coronene to hydrogenated coronene products.

To study the dehydrogenation of h-coronene using titanium hydride catalyst, 0.03 g of a h-coronene mixture containing 52% coronene and 48% hydrogenated coronene were ground by hand with 0.03 g of titanium hydride ($TiH_2$, Alfa Aesar) in an argon glovebox with an agate mortar and pestle until a uniform mixture was formed. In the glovebox, the mixture was then placed in a 50 cc high pressure reactor (Parr instruments) equipped with a customized grinding apparatus. The grinding apparatus consists of an elongated stirrer shaft with an arc-shaped paddle. The bottom of the reactor contains a stainless steel insert with a concave bottom, which allows the paddle of the stirrer shaft to sweep the bottom of the reactor with ⅛" clearance. Mechanical agitation of the sample mixture was performed by adding 5–8 stainless steel ball bearings of varying size (¹⁄₁₆"–¼" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls were loaded into the reactor, the system was pressurized to 1000 psia (69 bar) hydrogen and vented to 15 psia (1 bar). The h-coronene was dehydrogenated by heating the sample mixture to 150° C. under 15 psia (1 bar) hydrogen while the mixture was continuously ground for seven hours. The reactor was then quickly cooled to room temperature. The mixture was removed from the reactor and the dehydrogenated coronene (dh-coronene) was removed from the mixture by extracting with chloroform, filtering of the insoluble catalyst, and drying under vacuum. Gas chromatography-Mass spectroscopy (GC-MS) analysis was performed on the dehydrogenated h-Coronene. GC-MS indicates that approximately 90% of the h-coronene was converted to coronene upon dehydrogenation with titanium hydride.

EXAMPLE 7

Reversible Hydrogenation of Carbazole with 5% Rh on Carbon Catalyst and Mechanical Grinding A 0.2 g sample of carbazole (96%, Aldrich) and 0.1 g of rhodium on carbon catalyst (5% Rh, Acros Organics) were ground by hand with an agate mortar and pestle until a uniform mixture was formed. The mixture was then placed in a 50 cc high pressure reactor (Parr instruments) equipped with a customized grinding apparatus. The grinding apparatus consists of an elongated stirrer shaft with an arc-shaped paddle. The bottom of the reactor contains a stainless steel insert with a concave bottom, which allows the paddle of the stirrer shaft to sweep the bottom of the reactor with 1/8" clearance. Mechanical agitation of the sample mixture was performed by adding 5–8 stainless steel ball bearings of varying size (1/16"–1/4" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls are loaded into the reactor, the system was pressurized with helium to 1000 psia and vented. Pressurization and venting with helium was repeated three times. The reactor system was then twice pressurized to 1000 psia (69 bar) hydrogen and vented. The carbazole was hydrogenated by heating the sample mixture to 125° C. under 1050 psia (72.4 bar) hydrogen while the mixture was continuously ground for four hours. The reactor was then quickly cooled to room temperature and vented to atmospheric pressure. The reactor was brought into an argon glovebox and the mixture was removed from the reactor, weighed, and half of the material was returned to the reactor for dehydrogenation. The hydrogenated carbazole (h-carbazole) was removed from the mixture by extraction with acetone, filtering of the insoluble catalyst, and drying under vacuum. The reactor system was pressurized to 1000 psia (69 bar) hydrogen and vented to 15 psia (1 bar). The h-carbazole was dehydrogenated by heating the sample mixture to 125° C. under 15 psia (1 bar) hydrogen in the absence of mechanical grinding for four hours. The reactor was then quickly cooled to room temperature. The reactor was brought into an argon glovebox and the mixture was removed from the reactor. The dehydrogenated carbazole (dh-carbazole) was removed from the mixture by extraction with acetone, filtering of the insoluble catalyst, and drying under vacuum. The following tables show the product distribution of h-carbazole and dh-carbazole calculated from GC-MS from areas normalized for those masses:

TABLE 7

| h-Carbazole Sample Components | Molecular Formula | Percentage of Sample Mixture |
|---|---|---|
| Dodecahydrocarbazole | $C_{12}H_{21}N$ | 88 |
| Octahydrocarbazole | $C_{12}H_{17}N$ | 6 |
| Carbazole | $C_{12}H_9N$ | 0 |
| Dicyclohexyl | $C_{12}H_{22}$ | 6 |

TABLE 8

| dh-Carbazole Sample Components | Molecular Formula | Percentage of Sample Mixture |
|---|---|---|
| Dodecahydrocarbazole | $C_{12}H_{21}N$ | 16 |
| Octahydrocarbazole | $C_{12}H_{17}N$ | 14 |
| Tetrahydrocarbazole | $C_{12}H_{13}N$ | 50 |
| Carbazole | $C_{12}H_9N$ | 12 |
| Dicyclohexyl | $C_{12}H_{20}$ | 4 |
| Cyclohexylbenzene | $C_{12}H_{14}$ | 2 |
| Tributylamine | $C_{12}H_{27}N$ | 2 |

EXAMPLE 8

Dehydrogenation of Liquid Pyrene Under 0.15 to 0.26 Bar Hydrogen Pressure

A 0.4 g sample of substantially hydrogenated pyrene (colorless liquid at 25° C., h-pyrene) and 0.2 g platinum on carbon catalyst (10% Pt, Strem) were placed in a 50 cc high pressure reactor (Parr instruments) equipped with a customized grinding apparatus. The grinding apparatus consists of an elongated stirrer shaft with an arc-shaped paddle. The bottom of the reactor contains a stainless steel insert with a concave bottom, which allows the paddle of the stirrer shaft to sweep the bottom of the reactor with 1/8" clearance. Mechanical agitation of the sample mixture was performed by adding 5–8 stainless steel ball bearings of varying size (1/16"–1/4" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls were loaded into the reactor, the system was evacuated for 5 minutes and pressurized with helium to 700 psia (48.3 bar) and vented. Pressurization and venting with helium was repeated three times. The system was again evacuated and filled with a 15% hydrogen/85% helium mixture. The sample was dehydrogenated by grinding at 160° C. under a 15% hydrogen/85% helium mixture for 24 hours, initially at 15 psia (1 bar) for a hydrogen partial pressure of 2.25 psia (0.1 bar) and over the course of the heating and evolution of hydrogen from the dehydrogenation reaction, the pressure increased to 24 psia (1.7 bar) for a hydrogen partial pressure of about 3.6 psia (0.26 bar). After the reaction time, the reactor was quickly cooled to room temperature and vented. The sample mixture (dh-pyrene) was removed from the reactor and separated from the catalyst by extraction with chloroform (HPLC grade, Fisher) and filtering of the insoluble catalyst. The chloroform was then removed under vacuum to obtain the pure products. Gas chromatography-Mass spectroscopy (GC-MS) was used to analyze the hydrogenated pyrene and dehydrogenated h-pyrene. The following tables show the product distribution of h-pyrene and dh-pyrene calculated from GC-MS from areas normalized for those masses:

TABLE 9

| h-pyrene Sample Components | Molecular Formula | Percentage of Sample Mixture |
|---|---|---|
| pyrene | $C_{16}H_{10}$ | 0 |
| decahydropyrene | $C_{16}H_{20}$ | 35 |
| hexadecahydropyrene | $C_{16}H_{26}$ | 65 |

TABLE 10

| dh-pyrene Sample Components | Molecular Formula | Percentage of Sample Mixture |
|---|---|---|
| pyrene | $C_{16}H_{10}$ | 5 |
| dihydropyrene | $C_{16}H_{12}$ | 6.5 |
| tetrahydropyrene | $C_{16}H_{14}$ | 1.5 |
| hexahydropyrene | $C_{16}H_{16}$ | 25.4 |
| decahydropyrene | $C_{16}H_{20}$ | 5.7 |
| hexadecahydropyrene | $C_{16}H_{26}$ | 56 |

As calculated from the tables above, the gravimetric hydrogen storage capacity of the hydrogenated pyrene+ catalyst was 4.7 wt. % and after dehydrogenation the capacity was reduced to 3.7 wt. % hydrogen. This corresponds to approximately 21% of the stored hydrogen being released during dehydrogenation of h-pyrene.

EXAMPLE 9

Dehydrogenation of Liquid Pyrene Under 1 Bar Hydrogen Pressure

A 0.4 g sample of substantially hydrogenated pyrene (colorless liquid at 25° C., h-pyrene) and 0.2 g rhodium on carbon catalyst (5% Rh, Acros Organics) were placed in a 50 cc high pressure reactor (Parr instruments) equipped with a customized grinding apparatus. The grinding apparatus consists of an elongated stirrer shaft with an arc-shaped paddle. The bottom of the reactor contains a stainless steel insert with a concave bottom, which allows the paddle of the stirrer shaft to sweep the bottom of the reactor with ⅛" clearance. Mechanical agitation of the sample mixture was performed by adding 5–8 stainless steel ball bearings of varying size (¹⁄₁₆"–¼" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls were loaded into the reactor, the system was evacuated for 5 minutes and pressurized with helium to 1000 psia (69 bar) and vented. Pressurization and venting with helium was repeated three times. The system was filled with 14.5 psia hydrogen (1 bar). The sample was dehydrogenated by grinding at 150° C. under 23 psia (1.6 bar) hydrogen pressure for 16 hours. After the reaction time, the reactor was quickly cooled to room temperature and vented. The still-liquid sample mixture (dh-pyrene) was removed from the reactor and separated from the catalyst by extraction with chloroform (HPLC grade, Fisher) and filtering of the insoluble catalyst. The chloroform was then removed under vacuum to obtain the pure products. Gas chromatography-Mass spectroscopy (GC-MS) was used to analyze the hydrogenated pyrene and dehydrogenated h-pyrene. The following tables show the product distribution of h-pyrene and dh-pyrene calculated from GC-MS from areas normalized for those masses:

TABLE 11

| h-pyrene Sample Components | Molecular Formula | Percentage of Sample Mixture |
|---|---|---|
| pyrene | $C_{16}H_{10}$ | 0 |
| decahydropyrene | $C_{16}H_{20}$ | 35 |
| hexadecahydropyrene | $C_{16}H_{26}$ | 65 |

TABLE 12

| dh-pyrene Sample Components | Molecular Formula | Percentage of Sample Mixture |
|---|---|---|
| pyrene | $C_{16}H_{10}$ | 9.1 |
| dihydropyrene | $C_{16}H_{12}$ | 4.5 |
| tetrahydropyrene | $C_{16}H_{14}$ | 0.4 |
| hexahydropyrene | $C_{16}H_{16}$ | 20.3 |
| octahydropyrene | $C_{16}H_{18}$ | 0.3 |
| decahydropyrene | $C_{16}H_{20}$ | 19.4 |
| hexadecahydropyrene | $C_{16}H_{26}$ | 46 |

As calculated from the tables above, the gravimetric hydrogen storage capacity of the hydrogenated pyrene+ catalyst was 4.7 wt. % and after dehydrogenation the capacity was reduced to 3.5 wt. % hydrogen. This corresponds to approximately 25% of the stored hydrogen being released during dehydrogenation of h-pyrene.

COMPARATIVE EXAMPLE 1

Reversible Hydrogenation of Pentacene with 5% Rh on Carbon Catalyst

Figure 9:
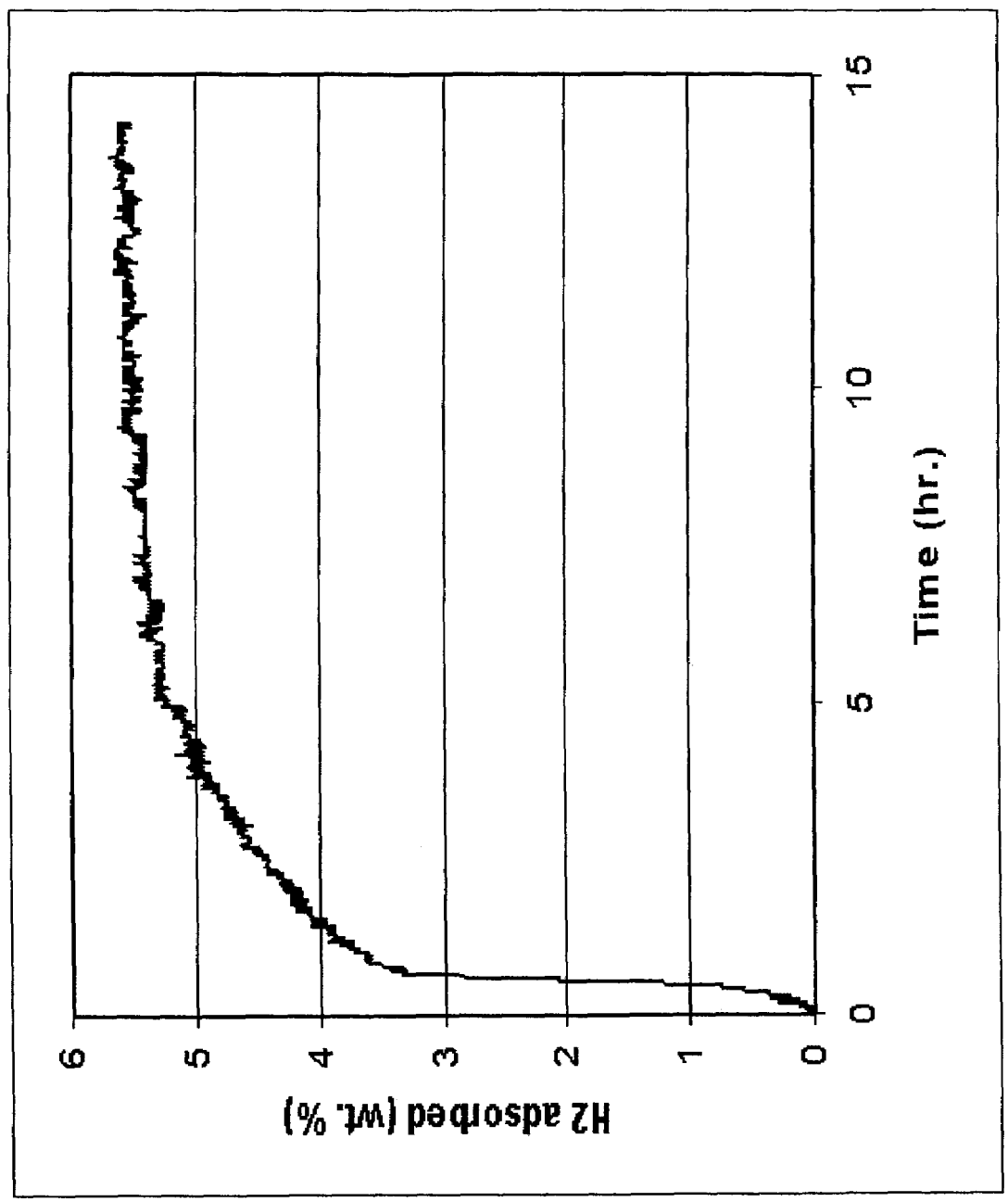
FIG. 9 is a plot of the hydrogen adsorption vs. time of a sample (Comparative Example 1) of pentacene with 5% Rh on carbon catalyst.
Figure 10:
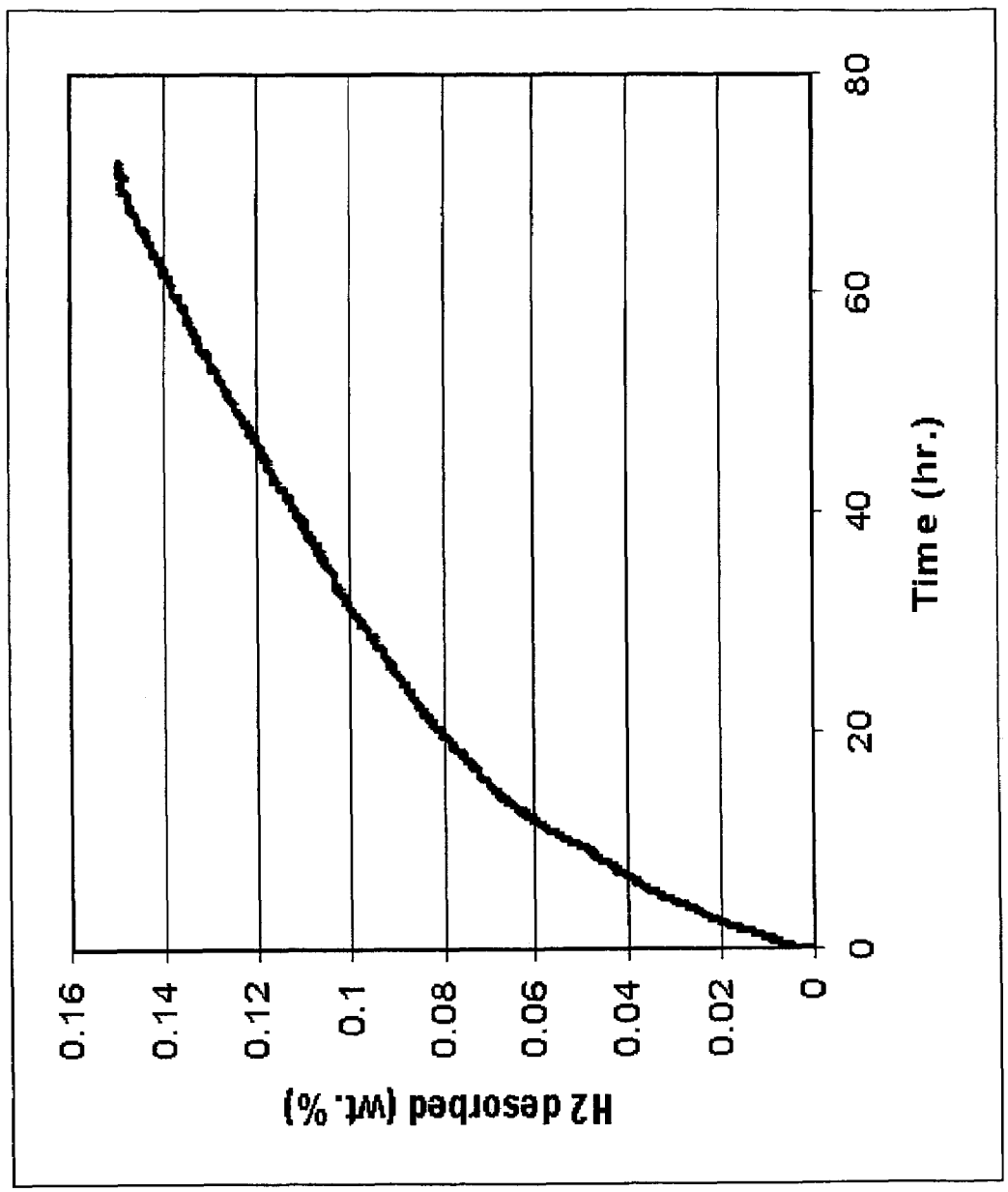
FIG. 10 is a plot of the hydrogen desorption vs. time of a sample (Comparative Example 1) of pentacene with 5% Rh on carbon catalyst.

A 0.100 g sample of pentacene (Aldrich) and 0.050 g of rhodium on carbon catalyst (5% Rh, Acros Organics) were ground with an agate mortar and pestle for 15 minutes until a uniform mixture was formed. The sample was then placed in a differential pressure adsorption unit. The adsorption unit consists of two identical pressure cells which are spanned by a differential pressure gauge. The absolute pressure of the two cells are measured independently by pressure transducers. Adsorption of hydrogen by the sample is characterized by a relative decrease of the pressure in the sample cell relative to the reference cell while maintaining an identical temperature between the two cells. The sample was degassed at ambient temperature for 20 minutes under vacuum. Both the sample cell and reference cells were placed under 980 psia (67.6 bar) hydrogen and heated to 150° C. The hydrogen pressure in the sample cell dropped, relative to the reference cell, for a period of about 8 hours, indicating adsorption of 5.5 wt. % hydrogen by the sample (FIG. 9). After 14 hours, the cells were cooled to ambient temperature and the pressure in both cells reduced to 18 psia (1.25 bar). Upon heating both cells to 150° C., there was a small increase in the pressure of the sample cell relative to the reference cell, indicating desorption of hydrogen from the sample (FIG. 10). After 70 hours, the sample had desorbed 0.15 wt. % hydrogen (2.7% of the sorbed hydrogen).

COMPARATIVE EXAMPLE 2

Attempted Dehydrogenation of Decahydronaphthalene (Decalin) with 5% Rh on Carbon Catalyst A 4.0 g sample of decahydronaphthalene (33% cis- and 66% trans-decalin, 99+%, Aldrich) and 2.0 g of rhodium on carbon catalyst (5% Rh, Acros Organics) were placed in a 25 cc high pressure reactor (Parr instruments). Once the sample mixture was loaded into the reactor, the system was pressurized with helium to 1000 psia (69 bar) and vented. Pressurization and venting with helium was repeated three times. The reactor was pressurized with 1000 psia (69 bar) hydrogen at 150° C. with stirring for one hour to activate the catalyst. The reactor system was vented down to 15 psia (1 bar) hydrogen pressure. Dehydrogenation was attempted by continuous heating at 150° C. under 15 psia (1 bar) hydrogen for 16 hours. After cooling the reactor to room temperature, the sample was isolated by extraction with chloroform, filtering of the catalyst, and drying under vacuum. Gas Chromatography-Mass Spectroscopy indicated that the sample was 100% unreacted decahydronaphthalene and no detectable dehydrogenation had occurred.

DISCUSSION OF EXAMPLES

Example 1 demonstrates that the reversible hydrogenation of pyrene ($C_{16}H_{10}$) can be achieved under mild conditions and short reaction times starting from solid pyrene and a solid admixed catalyst. Under 1000 psia (69 bar) of hydrogen gas pressure at 95° C. with moderate mechanical grinding, the conversion of pyrene to hydrogenated pyrene compouds ($C_{16}H_{12}$—$C_{16}H_{26}$) is 99.5% in 1.5 hours (Table 1). This is a 2.3 wt. % increase of the gravimetric hydrogen capacity on a total sample weight basis (pyrene+catalyst). The temperature at which the hydrogenation is performed is well below the melting point of pyrene (149° C.). The hydrogenated pyrene can be isolated as a solid material at room temperature that shows a melting point onset of approximately 110° C. Thus, it is likely that pyrene, a solid at the onset of the hydrogenation, remains a solid during the hydrogenation reaction performed at 95° C. The mixture of hydrogenated pyrene compounds can be dehydrogenated, under 15 psia (1 bar) hydrogen gas pressure, at 95° C. with moderate mechanical grinding. After three hours under these conditions, 25% of the sample was converted back to pyrene and the abundance of dihydropyrene ($C_{16}H_{12}$) was increased relative to the more deeply hydrogenated species.

Example 2 teaches that the reversible hydrogenation of coronene ($C_{24}H_{12}$) can be achieved under mild conditions and short reaction times starting from solid coronene and a solid admixed catalyst. Under 1045 psia (72 bar) of hydrogen gas pressure at 150° C. with moderate mechanical grinding, the conversion of coronene to hydrogenated coronene compounds ($C_{24}H_{22}$—$C_{24}H_{30}$) is 99+% in 4 hours (Table 3). This is a 3.5 wt. % increase of the gravimetric hydrogen capacity on a total sample weight basis (coronene+catalyst). The temperature at which the hydrogenation is performed is far below the melting point of coronene (442° C.). The hydrogenated coronene can be isolated as a solid material at room temperature that shows a melting point onset at approximately 280° C. Thus, it is likely that coronene, a solid at the onset of hydrogenation, remains a solid during the hydrogenation reaction performed at 150° C. The mixture of hydrogenated coronene compounds can be dehydrogenated, under 15 psia (1 bar) hydrogen gas pressure, at 150° C. with moderate mechanical grinding. After 16 hours under these conditions, 91% of the sample was converted back to coronene (Table 4).

Example 3 demonstrates that the reversible hydrogenation of coronene can be used to store hydrogen under mild conditions of temperature and pressure and in the absence of mechanical grinding, using solid coronene and a solid admixed catalyst. Under 970 psia (67 bar) of hydrogen gas pressure at 150° C., a 3.2 wt. % increase of the gravimetric hydrogen capacity on a total sample weight basis (coronene+catalyst) is observed over a period of 17 hours (FIG. 4). The mixture of hydrogenated coronene compounds can be dehydrogenated, under 20 psia (1.4 bar) hydrogen gas pressure, at 150° C. in the absence of mechanical grinding. After 70 hours under these conditions the sample desorbed 1.0 wt. % hydrogen (FIG. 5, 31% of the sorbed hydrogen).

Figure 8:
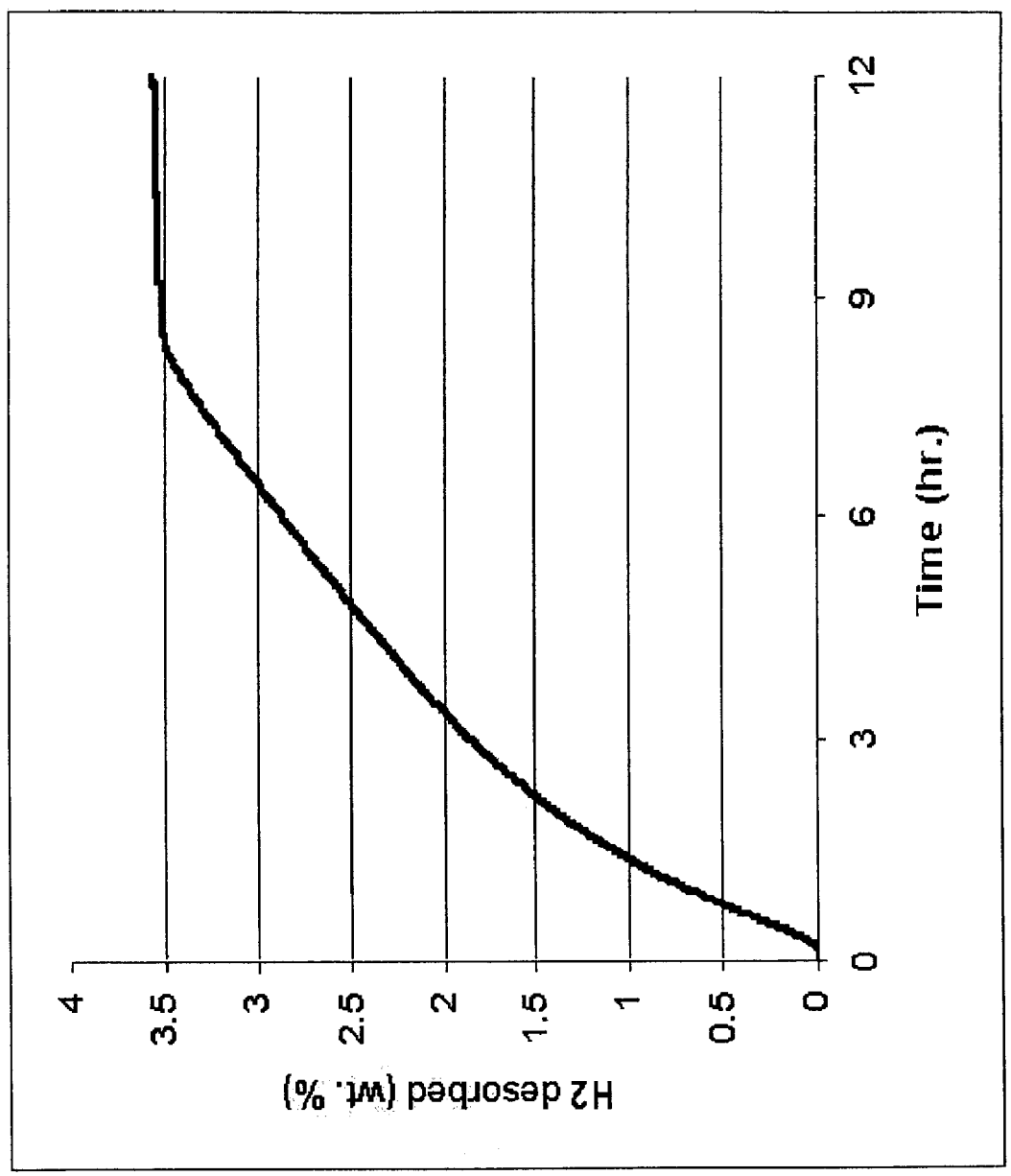
FIG. 8 is a plot of the hydrogen desorption vs. time, cycle #2, of a sample (Example 4) of coronene with palladium metal catalyst.

Example 4 demonstrates that the reversible hydrogenation of coronene can be used to store large quantities of hydrogen under mild conditions of temperature and pressure and in the absence of mechanical grinding, using solid coronene and a solid admixed catalyst. The adsorbent can be subjected to multiple cycles of hydrogenation and dehydrogenation, thus forming the basis for a cyclic hydrogen storage process. Under 995 psia (68.6 bar) of hydrogen gas pressure at 150° C., a 4.9 wt. % increase of the gravimetric hydrogen capacity on a total sample weight basis (coronene+catalyst) is observed over a period of 63 hours (FIG. 6, cycle #1). The mixture of hydrogenated coronene compounds can be dehydrogenated, under 20 psia (1.4 bar) hydrogen gas pressure, at between 150° C. and 200° C. in the absence of mechanical grinding (FIG. 7). After 24 hours at 150° C. and 14 hours at 200° C. the sample desorbed 4.5 wt. % hydrogen (92% of the sorbed hydrogen). The sample was hydrogenated a second time; under 1005 psia (69.4 bar) of hydrogen gas pressure at 150° C., a 3.9 wt. % increase of the gravimetric hydrogen capacity on a total sample weight basis (coronene+catalyst) is observed over a period of 91 hours (FIG. 6, cycle #2). The mixture of hydrogenated coronene compounds can be dehydrogenated, under 20 psia (1.4 bar) hydrogen gas pressure, at 200° C. in the absence of mechanical grinding (FIG. 8). After 9 hours at 200° C. the sample desorbed 3.5 wt. % hydrogen (90% of the sorbed hydrogen). FIGS. 7 and 8 further demonstrate an advantage of gas/solid hydrogenation and dehydrogenation of a two component solid system (hydrogenated and dehydrogenated forms of the solid substrate) in that the hydrogenation and dehydrogenation of the solid can easily and effectively go to completion under equilibrium conditions.

Example 5 teaches that the reversible hydrogenation of hexabenzocoronene ($C_{42}H_{18}$) can be achieved starting from solid hexabenzocoronene and a solid admixed catalyst. Under 1130 psia (78 bar) of hydrogen gas pressure at 200° C. with moderate mechanical grinding, the conversion of hexabenzocoronene to hydrogenated hexabenzocoronene compounds ($C_{42}H_{24}$—$C_{42}H_{36}$) is 72% in 8 hours (Table 5). This represents a 1.65 wt. % increase of the gravimetric hydrogen capacity on a total sample weight basis (hexabenzocoronene+catalyst). The temperature at which the hydrogenation is performed is 500+° C. below the melting point of hexabenzocoronene (700+° C.). Thus, it is extremely likely that hexabenzocoronene, a solid at the onset of hydrogenation, remains a solid during the hydrogenation reaction performed at 200° C. The mixture of hydrogenated hexabenzocoronene compounds can be dehydrogenated, under 15 psia (1 bar) hydrogen gas pressure, at 200° C. with moderate mechanical grinding. After 16 hours under these conditions, 58% of the hydrogenated hexabenzocoronene was converted back to hexabenzocoronene.

Example 6 demonstrates that the reversible hydrogenation of coronene ($C_{24}H_{12}$) can be achieved under mild conditions and short reaction times starting from solid coronene and a solid admixed catalyst from the group of early transition metals (Sc, Y, Ti, Zr, Hf, V, Nb, Ta). This is notable in that metals and metal alloys of the late transition metals (Fe, Ru, Os, Co, Rh, Ir, Ni, Pd, Pt) are typically employed as catalysts for hydrogenation and/or dehydrogenation. In addition, this example teaches that a catalyst in the form of a stable metal hydride ($MH_x$) can be utilized for the reversible hydrogenation of extended pi-conjugated substrates. Under 1185 psia (82 bar) of hydrogen gas pressure at 200° C. with moderate mechanical grinding, the conversion of coronene to hydrogenated coronene compounds (h-coronene) is 44% in only 2 hours. The mixture of hydrogenated coronene compouds can be dehydrogenated, under 15 psia (1 bar) hydrogen gas pressure, at 150° C. with moderate mechanical grinding. After 7 hours under these conditions, 90% of the h-coronene was converted back to coronene.

Example 7 teaches that the reversible hydrogenation of extended pi-conjugated substrates containing heteroatoms (e.g. N, O, S) can be performed under mild conditions and short reaction times in the solid state for the storage of hydrogen. A mixture of solid carbazole ($C_{12}H_9N$) and solid catalyst can be used to efficiently adsorb hydrogen in four hours or less at 125° C. and 1050 psia (72.4 bar) hydrogen gas pressure. This temperature is over 120° C. below the melting point of carbazole (246° C.), which suggests that the hydrogenation occurs readily in the solid state. The quantitative hydrogenation of carbazole and the very high conversion (94%) to the perhydrogenated form, dodecahydrocarbazole ($C_{12}H_{21}N$), leads to a large 6.6 wt. % hydrogen storage capacity. A small amount of hydrogenolysis is observed in the formation of dicyclohexyl during the hydrogenation reaction. This could be attenuated by lessening the reaction time and/or stopping the hydrogenation reaction immediately after complete conversion of carbazole. The generally smaller $\Delta H$ of hydrogenation predicted for polyaromatic hydrocarbons containing N heteroatoms (FIG. 2 and related discussion) is manifested in a facile dehydrogenation of the hydrogenated carbazole. Dehydrogenation is accomplished at only 125° C. under 15 psia (1 bar) hydrogen gas pressure in the absence of mechanical grinding to yield 3.1 wt. % hydrogen gas after only four hours. A small amount of additional hydrogenolysis is observed during the dehydrogenation reaction leading to the observation of dicyclohexyl, cyclohexylbenzene, and tributylamine.

Example 8 demonstrates that the dehydrogenation of a hydrogenated liquid extended pi-conjugated substrate as taught by this invention can be achieved under mild conditions. Starting from a liquid hydrogenated pyrene and a solid admixed catalyst under 24 psia (1.7 bar) of 15% hydrogen/ 85% helium gas pressure at 160° C. with moderate mechanical grinding, the conversion of hydrogenated pyrene ($C_{16}H_2O$—$C_{16}H_{26}$) to dehydrogenated pyrene compounds ($C_{16}H_{10}$—$C_{16}H_{26}$) results in liberation of 21% of the stored hydrogen (Table 10). Due to the extensive hydrogenation of the pyrene (Table 9), the melting point of the starting liquid is below 25° C. After the dehydrogenation was ended, the mixture of dehydrogenated pyrene compounds ($CO_6H_{10}$—$C_{16}H_{26}$) was still found to be liquid at 25° C.

Example 9 demonstrates that the dehydrogenation of a hydrogenated liquid substrate can be achieved at a mild temperature under hydrogen partial pressures of greater than about 1 bar. Starting from a liquid hydrogenated pyrene and a solid admixed catalyst under 23 psia (1.7 bar) of hydrogen gas pressure at 150° C. with moderate mechanical grinding, the conversion of hydrogenated pyrene ($C_{16}H_2O$—$C_{16}H_{26}$) to dehydrogenated pyrene compounds ($C_{16}H_{10}$—$C_{16}H_{26}$) results in liberation of 25% of the stored hydrogen (Table 12). Due to the extensive hydrogenation of the pyrene (Table 11), the melting point of the starting liquid is below 25° C. After the dehydrogenation was ended, the mixture of dehydrogenated pyrene compounds ($C_{16}H_{10}$—$C_{16}H_{26}$) was still found to be liquid at 25° C. The extent of dehydrogenation of liquid hydrogenated pyrene can be compared to that of liquid decalin in comparative Example 2. At the same temperature (150° C.) and even lower hydrogen pressure (15 psia), the dehydrogenation of decalin proceeded to undetectable (<0.5%) conversion after 16 hours.

Comparative Example 1 demonstrates that the reversible hydrogenation of pentacene, a five-ring LPAH containing only one aromatic sextet, is not an efficient process for the storage of hydrogen under mild conditions of temperature and pressure using solid pentacene and a solid admixed catalyst. The $\Delta H°$ for the hydrogenation of pentacene (−17.5 kcal/mol $H_2$) is substantially larger than the $\Delta H°$ for the hydrogenation of coronene (−13.8 kcal/mol $H_2$). Under 980 psia (67.6 bar) of hydrogen gas pressure at 150° C., a 5.5 wt. % increase of the gravimetric hydrogen capacity on a total sample weight basis (pentacene+catalyst) is observed over a period of 10 hours (FIG. 9). The difference in $\Delta H°$ of hydrogenation is manifested by an apparent increase in hydrogenation efficiency for pentacene (5.5 wt. % $H_2$ adsorbed in 10 hours) vs. coronene (3.2 wt. % $H_2$ adsorbed in 17 hours) under essentially identical process conditions. The temperature at which the hydrogenation is performed is far below the melting point of pentacene (m.p.>300° C.). Thus it is likely that pentacene, a solid at the onset of hydrogenation, remains a solid during the hydrogenation and dehydrogenation reactions performed at 150° C. The mixture of hydrogenated pentacene compounds are not dehydrogenated at an effective conversion, under 18 psia (1.25 bar) hydrogen gas pressure, at 150° C. After 70 hours under these conditions the sample desorbs only 0.15 wt. % hydrogen (FIG. 10, 2.7% of the sorbed hydrogen). This is compared to the dehydrogenation of coronene in Example 3 where after 70 hours at these same conditions the hydrogenated coronene sample desorbs 1.0 wt. % hydrogen (FIG. 5, 31% of the initially sorbed hydrogen). The greater than order-of-magnitude (11.5×) decrease in percentage of desorbed hydrogen for pentacene compared to coronene under identical process conditions again illustrates the substantial difference of $\Delta H°$ for hydrogenation between these two polyaromatic hydrocarbon molecules and the importance of $\Delta H°$ of hydrogenation in a hydrogen storage system based upon reversible hydrogenation of polyaromatic hydrocarbon.

Comparative Example 2 demonstrates that an aromatic hydrocarbon, which is taught in the art as a hydrogen carrier which can release hydrogen by a catalytic dehydrogenation, is not effective for reversible hydrogen storage under the milder and more useful conditions of temperature and hydrogen pressure described in the current invention. Decahydronaphthalene (decalin) was subjected to more rigorous dehydrogenation conditions as compared to hydrogenated pyrene (Example 1) and essentially identical dehydrogenation conditions as hydrogenated coronene (Example 2). The decalin sample was heated with catalyst to 150° C. under 15 psia (1 bar) hydrogen gas pressure. After 16 hours under these conditions there was no measureable conversion (<0.5%) of decalin to any dehydrogenated products. This dehydrogenation result compares unfavorably to those for liquid pyrene (Example 9, 25% dehydrogenated at 150° C., 16 hours, 1 bar hydrogen pressure) and hydrogenated coronene (Example 2, 91% dehydrogenated at 150° C., 16 hours, 1 bar hydrogen pressure) in Examples 1 and 2. Although pyrene can be either a solid or liquid during the dehydrogenation process conditions depending on conversion (see discussion of Examples 1 and 8), it is likely that coronene is solid during the both hydrogenation and dehydrogenation. Decalin is a liquid at 150° C.

The invention claimed is:
1. A process for the storage and subsequent release of hydrogen comprising:
    a) contacting hydrogen, in the presence of a hydrogenation catalyst under hydrogenation conditions, with an extended pi-conjugated substrate that comprises at least one member selected from the group consisting of:

polycyclic aromatic hydrocarbons having at least four rings, polycyclic aromatic hydrocarbons with at least one of nitrogen or oxygen heteroatoms, pi-conjugated aromatic molecules comprising five membered rings, pi-conjugated aromatic molecules comprising six and five membered rings with at least one of nitrogen or oxygen heteroatoms in the five membered ring structure, polycyclic aromatic hydrocarbons with ketone groups in the ring structure, and pi-conjugated organic oligomers, to effect storage of hydrogen by forming an at least partially hydrogenated extended pi-conjugated substrate; and thereafter b) contacting the at least partially hydrogenated extended pi-conjugated substrate under dehydrogenation conditions in the presence of an effective amount of a dehydrogenation catalyst to release hydrogen from the at least partially hydrogenated extended pi-conjugated substrate.

2. The process of claim 1 wherein the extended pi-conjugated substrate comprises polycyclic aromatic hydrocarbons with nitrogen or oxygen heteroatoms.

3. The process of claim 1 wherein the extended pi-conjugated substrate comprises at least one member selected from the group consisting of pyrene, perylene, chrysene, triphenylene, coronene, hexabenzocoronene, ovalene, picene, rubicene, fluorene, indene, acenaphthylene, carbazole, 1,4,5,8,9,12-hexaazatriphenylene, phenanthroline, quinoline, acridine, and dibenzofuran.

4. The process of claim 3 wherein the extended pi-conjugated substrate comprises at least one member selected from the group consisting of fluorene, indene, acenaphthylene, carbazole, 1,4,5,8,9,1 2-hexaazatriphenylene, phenanthroline, quinoline, acridine and dibenzofuran.

5. The process of claim 4 wherein the substrate comprises a carbazole.

6. The process of claim 1 wherein step a) and step b) are conducted within a single vessel.

7. The process of claim 1 wherein the hydrogenation catalyst also functions as the dehydrogenation catalyst.

8. The process of claim 1 wherein the extended pi-conjugated substrate in step a) resides in the liquid state and step a) is conducted in a first vessel and the at least partially hydrogenated extended pi-conjugated substrate in step b) resides in the liquid state and step b) is conducted in a second vessel.

9. The process of claim 8 wherein the extended pi-conjugated substrate in step a) resides in the liquid state and step a) is conducted in a first vessel and the at least partially hydrogenated extended pi-conjugated substrate of step b) has a melting point of below about minus 10° C. and step b) is conducted in a second vessel.

10. The process of claim 1 wherein the at least partially hydrogenated extended pi-conjugated substrate of step b) has a melting point below about 100° C.

11. The process of claim 1 wherein the hydrogen released in step b) is at least 1% by weight of the weight of the at least partially hydrogenated extended pi-conjugated substrate.

12. The process of claim 1 further comprising
c) removing the hydrogenation catalyst from the at least partially hydrogenated extended pi-conjugated substrate obtained from step a) prior to conducting step b).

13. The process of claim 1 wherein step b) is conducted at a temperature below about 250° C. and at a hydrogen partial pressure greater than approximately 0.1 bar.

14. The process of claim 1 wherein step b) is conducted at a temperature below about 250° C. and at a hydrogen partial pressure greater than approximately 1 bar.

15. The process of claim 1 wherein the extended pi-conjugated substrate in step a) comprises a polycyclic aromatic hydrocarbon comprising a fused ring system having at least 4 rings wherein at least two of such rings of the fused ring system are represented as six-membered aromatic sextet structures.

16. The process of claim 1 wherein the extended pi-conjugated substrate in step a) comprises a polycyclic aromatic hydrocarbon with at least two fused carbon ring structures wherein at least one of said carbon ring structures comprises a ketone group in the carbon ring structure and the carbon ring structure with the ketone group is fused to at least one carbon ring structure which is represented as an aromatic sextet.

17. The process of claim 1 wherein the extended pi-conjugated substrate in step a) comprises a polycyclic aromatic hydrocarbon additionally comprising a six-membered aromatic sextet ring fused with a 5-membered ring structure.

18. The process of claim 1 wherein the extended pi-conjugated substrate in step a) comprises a polycyclic aromatic hydrocarbon comprising at least 2 rings and at least one ring is a six-membered aromatic sextet structure and at least one ring contains a nitrogen or oxygen heteroatom.

19. The process of claim 1 wherein the extended pi-conjugated substrate in step a) comprises a polycyclic aromatic hydrocarbon additionally comprising nitrogen or oxygen heteroatoms within the ring structure.

20. The process of claim 1 wherein the extended pi-conjugated substrate additionally comprises a ring substituent selected from the group consisting of an alkyl group, an alkoxy group, an ether group, and a polyether group.

21. The process of claim 20 wherein the ring substituent comprises an alkyl group.

22. The process of claim 1 wherein the experimentally determined modulus of the standard enthalpy change of hydrogenation of the extended pi-conjugated substrate in step a) is less than about 15.0 kcal/mol $H_2$.

23. The process of claim 1 wherein the modulus of the standard enthalpy change of hydrogenation of the extended pi-conjugated substrate in step a) calculated by the PM3 method is less than about 15.6 kcal/mol $H_2$.

24. The process of claim 1 wherein the extended pi-conjugated substrate in step a) comprises a mixture of at least two different extended pi-conjugated substrates.

25. The process of claim 1 wherein the extended pi-conjugated substrate in step a) has a normal melting point above about 200° C. and is subjected to step a) while present in a mixture of at least two different extended pi-conjugated substrates with a melting point of less than about 200° C.

26. The process of claim 1 wherein the at least partially hydrogenated extended pi-conjugated substrate from step a) has a melting point of less than about 200° C.

27. The process of claim 1 wherein the at least partially hydrogenated extended pi-conjugated substrate from step a) has a melting point of less than about 100° C.

28. The process of claim 1 wherein the at least partially hydrogenated extended pi-conjugated substrate from step a) has a melting point of less than about minus 10° C.

29. The process of claim 1 wherein the extended pi-conjugated substrate in step a) comprises an organic oligomer which comprises at least two repeat units containing at least one aromatic sextet of conjugated bonds.

30. The process of claim 29 wherein the repeat units comprise ring structures with ring heteroatoms selected from the group consisting of nitrogen and oxygen.

31. The process of claim 1 wherein the extended pi-conjugated substrate in step a) comprises an organic oligomer which comprises at least two repeat units containing a five membered ring structure with two double bonds and a heteroatom selected from the group consisting of nitrogen, oxygen and sulfur.

32. The process of claim 1 wherein the extended pi-conjugated substrate in step a) comprises an organic oligomer which comprises at least two repeat units containing five and six membered ring structures.

33. The process of claim 32 wherein the repeat units comprise ring structures with ring heteroatoms selected from the group consisting of nitrogen and oxygen.

34. The process of claim 1 wherein the extended pi-conjugated substrate in step a) is contained within a natural pitch.

35. The process of claim 1 wherein the extended pi-conjugated substrate in step a) is contained within a synthetic pitch.

36. The process of claim 1 wherein the hydrogenation catalyst in step a) comprises a metal selected from groups 4, 5, 6 and 8, 9, 10 of the Periodic Table according to the International Union of Pure and Applied Chemistry.

37. The process of claim 1 wherein the hydrogenation catalyst in step a) comprises a metal selected from the group consisting of titanium, zirconium, cobalt, niobium, tantalum, iron, molybdenum, tungsten, ruthenium, rhodium, iridium, nickel, palladium, and platinum.

38. The process of claim 1 wherein the dehydrogenation catalyst in step b) comprises a metal selected from groups 4, 5, 6 and 8, 9, 10 of the Periodic Table according to the International Union of Pure and Applied Chemistry.

39. The process of claim 1 wherein the dehydrogenation catalyst in step b) comprises a metal selected from the group consisting of titanium, zirconium, cobalt, niobium, tantalum, iron, molybdenum, tungsten, ruthenium, rhodium, iridium, nickel, palladium, and platinum.

40. The process of claim 1 wherein the dehydrogenation catalyst in step b) comprises an acidic support selected from the group consisting of silica-alumina, gamma-alumina, zeolites in the proton-exchanged form, sulfonated zirconia, solid perfluorinated polymeric sulfonic acids, aluminum trifluoride, aluminum chlorofluorides, zinc chloride, aluminum chloride, tin chloride, copper trifluoromethane sulfonate, scandium trichloride, hexafluoroacetylacetonate complexes of the members of the Lanthanide series of elements according to the Periodic Table according to the International Union of Pure and Applied Chemistry.

41. The process of claim 1 wherein the extended pi-conjugated substrate in step a) comprises coronene and wherein step b) is conducted at a temperature of below about 250° C. and at a hydrogen partial pressure above about 0.1 bar.

42. The process of claim 1 wherein the extended pi-conjugated substrate in step a) comprises pyrene and wherein step b) is conducted at a temperature of below about 200° C. and at a hydrogen partial pressure above about 0.1 bar.

43. The process of claim 1 wherein the extended pi-conjugated substrate in step a) comprises carbazole and wherein step b) is conducted at a temperature of below about 250° C. and at a hydrogen partial pressure above about 0.1 bar.

44. The process of claim 1 wherein the substrate comprises polycyclic aromatic hydrocarbons with nitrogen heteroatoms.

45. The process of claim 1 wherein the substrate comprises pi-conjugated aromatic molecules comprising six and five membered rings with at least one of nitrogen or oxygen heteroatoms in the five membered ring structure.

46. A process for the storage of hydrogen comprising contacting hydrogen gas with a solid extended pi-conjugated substrate comprising at least one member selected from the group consisting of: polycyclic aromatic hydrocarbons having at least four rings, polycyclic aromatic hydrocarbons with at least one of nitrogen or oxygen heteroatoms, pi-conjugated aromatic molecules comprising five membered rings, pi-conjugated aromatic molecules comprising six and five membered rings with at least one of nitrogen or oxygen heteroatoms in the five membered ring structure, and pi-conjugated organic oligomers, in the presence of an effective amount of a hydrogenation catalyst under hydrogenation conditions to at least partially hydrogenate the extended pi-conjugated substrate.

47. A process for the storage of hydrogen comprising contacting hydrogen gas at a hydrogen partial pressure greater than about 6.7 bar and at a temperature of between about 50° C. and about 300° C. with a solid extended pi-conjugated substrate comprising at least one member selected from the group consisting of: polycyclic aromatic hydrocarbons having at least four rings, polycyclic aromatic hydrocarbons with at least one of nitrogen or oxygen heteroatoms, pi-conjugated aromatic molecules comprising five membered rings, pi-conjugated aromatic molecules comprising six and five membered rings with at least one of nitrogen or oxygen heteroatoms in the five membered ring structure, polycyclic aromatic hydrocarbons with ketone groups in the ring structure, and pi-conjugated organic oligomers, in the presence of an effective amount of a hydrogenation catalyst to at least partially hydrogenate the extended pi-conjugated substrate.

48. A process for releasing hydrogen comprising:
exposing a substrate comprising at least one at least partially hydrogenated extended pi-conjugated substrate selected from the group consisting of polycyclic aromatic hydrocarbons having at least four rings, polycyclic aromatic hydrocarbons with at least one of nitrogen or oxygen heteroatoms, pi-conjugated aromatic molecules comprising five membered rings, pi-conjugated aromatic molecules comprising six and five membered rings with at least one of nitrogen or oxygen heteroatoms in the five membered ring structure, polycyclic aromatic hydrocarbons with ketone groups in the ring structure, and pi-conjugated organic oligomers; with an effective amount of at least one catalyst under conditions sufficient to remove hydrogen from the substrate.

49. The process of claim 48 wherein the substrate comprises polycyclic aromatic hydrocarbons having at least four rings.

50. The process of claim 48 wherein the substrate comprises polycyclic aromatic hydrocarbons with at least one of nitrogen or oxygen heteroatoms.

51. The process of claim 50 wherein the heteroatoms comprise nitrogen.

52. The process of claim 48 wherein the substrate comprises pi-conjugated aromatic molecules comprising five membered rings.

53. The process of claim 48 wherein the substrate comprises pi-conjugated aromatic molecules comprising six and five membered rings with at least one of nitrogen or oxygen heteroatoms in the five membered ring structure.

54. The process of claim 48 wherein the substrate comprises pi-conjugated organic oligomers.

55. The process of claim 48 wherein the substrate comprises a carbazole or an alkylated carbazole.

56. The process of claim 48 wherein the substrate comprises polycyclic aromatic hydrocarbons with ketone groups in the ring structure.

* * * * *

UNITED STATES PATENT AND TRADEMARK OFFICE
CERTIFICATE OF CORRECTION

PATENT NO. : 7,101,530 B2  Page 1 of 1
APPLICATION NO. : 10/430246
DATED : September 5, 2006
INVENTOR(S) : Guido Peter Pez et al.

It is certified that error appears in the above-identified patent and that said Letters Patent is hereby corrected as shown below:

Colum 33, line 32
In claim 4, add a space after the number 9
Delete space between the 1 and 2 .... Should read, --1,4,5,8,9, 12-hexaazatriphenylene...--.

Column 36, line 15
In claim 46, insert -- polycyclic aromatic hydrocarbons with ketone groups in the ring structure-- before the words "and pi-conjugated organic oligomers,"

Signed and Sealed this

Twenty-eighth Day of November, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,101,530 B2 | |
| APPLICATION NO. | : 10/430246 | |
| DATED | : September 5, 2006 | |
| INVENTOR(S) | : Guido P. Pez et al. | |

It is certified that error appears in the above-identified patent and that said Letters Patent is hereby corrected as shown below:

Column 1 - After the Title but before Background of Invention, add the following:

"This invention was made with the U.S. Government support under Contract No. DE-FC36-04GTO14006 awarded by the Department of Energy. The Government has certain rights in this invention."

Signed and Sealed this

Ninth Day of December, 2008

JON W. DUDAS
*Director of the United States Patent and Trademark Office*